United States Patent
Kubota

(10) Patent No.: US 7,653,968 B2
(45) Date of Patent: Feb. 2, 2010

(54) HINGE DEVICE AND ELECTRONIC INSTRUMENT USING THE HINGE DEVICE

(75) Inventor: Naoki Kubota, Kawagoe (JP)

(73) Assignee: Kabushiki Kaisha Strawberry Corporation, Kawagoe-shi (JP)

( * ) Notice: Subject to any disclaimer, the term of this patent is extended or adjusted under 35 U.S.C. 154(b) by 46 days.

(21) Appl. No.: 11/930,646

(22) Filed: Oct. 31, 2007

(65) Prior Publication Data

US 2008/0201900 A1    Aug. 28, 2008

Related U.S. Application Data

(62) Division of application No. 10/536,837, filed as application No. PCT/JP03/016002 on Dec. 12, 2003, now Pat. No. 7,434,296.

(30) Foreign Application Priority Data

Jan. 31, 2003  (JP)  ............... 2003-024067
Aug. 29, 2003  (JP)  ............... 2003-209785

(51) Int. Cl.
*E05D 11/10* (2006.01)
(52) U.S. Cl. .................. 16/330; 16/303; 379/433.12
(58) Field of Classification Search ............ 16/330, 16/303, 336, 334, 307, 308; 379/433.12, 379/433.13; 455/90.3, 550.1, 575.1, 575.3, 455/575.4; 348/373, 333.06, 794; 361/681, 361/679, 680, 682, 683
See application file for complete search history.

(56) References Cited

U.S. PATENT DOCUMENTS 6,678,539 B1 *  1/2004  Lu .................... 455/575.1
6,952,860 B2 * 10/2005  Kawamoto ............ 16/285

(Continued)

FOREIGN PATENT DOCUMENTS

JP         09-181806        7/1997

(Continued)

OTHER PUBLICATIONS

International Search Report dated Mar. 23, 2004, In'l Appl. No. PCT/JP03/16002, 4 pages.

*Primary Examiner*—Chuck Y. Mah
(74) *Attorney, Agent, or Firm*—Connolly Bove Lodge & Hutz LLP

(57) ABSTRACT

The present invention provides as an object a novel hinge device which is extremely valuable as a commercial product and an electronic instrument using the hinge device. A hinge device for pivoting a first member (1) and a second member (2) to be rotatably opened and closed is characterized in that when the second member (2) kept under a coupled and closed condition is opened to the first member (1), in a rotational range A1 from the coupled and closed position P1 to a predetermined open angle position P2 rotated in an open direction, a closing rotational biasing effect is generated for automatically closing the second member (2) to the coupled and closed position P1 relative to the first member (1), and when the second member (2) is manually rotated in the open direction exceeding the predetermined open angle position P2 to the first member (1), an open rotational biasing effect is generated for automatically opening the second member (2) to a predetermined open angle position P3 relative to the first member (1).

10 Claims, 23 Drawing Sheets

U.S. PATENT DOCUMENTS

| | | | |
|---|---|---|---|
| 7,085,375 B2 * | 8/2006 | Katoh | 379/433.13 |
| 7,115,562 B2 * | 10/2006 | Krystal et al. | 514/2 |
| 7,168,133 B2 * | 1/2007 | Luo et al. | 16/303 |
| 7,168,134 B2 * | 1/2007 | Minami et al. | 16/303 |
| 7,171,247 B2 * | 1/2007 | Han | 455/575.3 |
| 7,213,301 B2 * | 5/2007 | Sakai et al. | 16/303 |
| 2004/0181909 A1 * | 9/2004 | Kawamoto | 16/330 |
| 2005/0138772 A1 * | 6/2005 | Park | 16/330 |
| 2006/0174443 A1 * | 8/2006 | Takagi et al. | 16/330 |

FOREIGN PATENT DOCUMENTS

| | | |
|---|---|---|
| JP | 2002-303316 | 10/2002 |
| JP | 2003-021134 | 1/2003 |
| JP | 2004-060697 | 2/2004 |

* cited by examiner

HINGE DEVICE AND ELECTRONIC INSTRUMENT USING THE HINGE DEVICE

CROSS REFERENCE TO RELATED APPLICATION

The present application is a divisional application of Ser. No. 10/536,837 filed May 31, 2005, now U.S. Pat. No. 7,434, 296 which is a national stage of PCT/JP2003/016002, filed Dec. 12, 2003, all of which are incorporated herein by reference in their entirety.

FIELD OF THE INVENTION

The present invention relates to a hinge device and an electronic instrument using the hinge device.

BACKGROUND ART

For example, a portable phone as a typical example of a portable electronic instrument is of collapsible type in which a portable phone body (a body portion and a joint portion) is collapsible.

This collapsible type is popular in aspects of preventing a switch from malfunctioning, making the phone compact when the phone is collapsed (to keep a display area sufficient), a variety of designs and the like.

Accordingly, while ones' eyes are kept on this collapsible type portable phone more and more, there are demands to provide a more useful phone.

The present applicant has made further experiments and studies repeatedly with respect to the above-described hinge device and has developed a novel hinge device and an electronic instrument using the hinge device which is more valuable as a commercial product.

DISCLOSURE OF THE INVENTION

The essence of the present invention will be described with reference to the accompanying drawings.

The present invention relates to a hinge device for pivoting a first member 1 and a second member 2 to be rotatably opened and closed, characterized in that when the second member 2 kept under a coupled and closed condition is opened to the first member 1, in a rotational range A1 from the coupled and closed position P1 to a predetermined open angle position P2 rotated in an open direction, a closing rotational biasing effect is generated for automatically closing the second member 2 to the coupled and closed position P1 relative to the first member 1, and when the second member 2 is manually rotated in the open direction exceeding the predetermined open angle position P2 to the first member 1, an open rotational biasing effect is generated for automatically opening the second member 2 to a predetermined open angle position P3 relative to the first member 1.

Also, the invention relates to a hinge device for pivoting a first member 1 and a second member 2 to be rotatably opened and closed, characterized in that when the second member 2 kept under a coupled and closed condition is opened to the first member 1, in a rotational range A1 from the coupled and closed position P1 to a predetermined open angle position P2 rotated in an open direction, a closing rotational biasing effect is generated for automatically closing the second member 2 to the coupled and closed position P1 relative to the first member 1, when the second member 2 is manually rotated in the open direction exceeding the predetermined open angle position P2 to the first member 1, an open rotational biasing effect is generated for automatically opening the second member 2 to a predetermined open angle position P3 relative to the first member 1, and in a rotational range A2 to the predetermined open angle position P2 rotated in the closing direction from a position where the second member 2 is opened to the first member 1, a free stop effect is generated for holding the second member 2 at any desired open angle position relative to the first member 1.

The invention relates to a hinge device for pivoting a first member 1 and a second member 2 to be rotatably opened and closed, characterized by comprising a closing structure portion 5 for generating a close rotational biasing effect for automatically closing the second member 2 to the coupled and closed position P1 relative to the first member 1 in a rotational range A1 from the coupled and closed position P1 to a predetermined open angle position P2 rotated in an open direction when the second member 2 kept under a coupled and closed condition is opened to the first member 1, an opening structure portion 6 for generating an open rotational biasing effect for automatically opening the second member 2 to a predetermined open angle position P3 relative to the first member 1, by biasing said closing structure portion in the rotational direction when the second member 2 is manually rotated in the open direction exceeding the predetermined open angle position P2 to the first member 1, and a rotation preventing structure portion 7 for releaseably retaining at said closing structure portion 5 and preventing the rotation of the closing structure portion 6 in the open direction by said opening structure portion 6, wherein a retention force of the rotation preventing structure portion 7 to the closing structure portion 5 is set up so that the rotation preventing structure portion 7 is not disengaged from the closing structure portion 5 by the opening rotational biasing force of said opening structure portion 6 and the rotation preventing structure portion 7 may be disengaged from the closing structure portion 5 when the second member 2 is manually rotated in the open direction exceeding the predetermined open angle position P2 against the closing rotational biasing force by said closing structure portion 5 relative to said first member 1.

Also, the invention relates to the hinge device according to claim 3, characterized in that a depression button portion 26 for releasing the retention of the rotation preventing structure portion 7 to said closing structure portion 5 is provided in said rotation preventing structure portion 7.

Also, the invention relates to a hinge device for pivoting a first member 1 and a second member 2 to be rotatably opened and closed, characterized by comprising a closing structure portion 5 for generating a close rotational basing effect for automatically closing the second member 2 to the coupled and closed position P1 relative to the first member 1 in a rotational range A1 from the coupled and closed position P1 to a predetermined open angle position P2 rotated in an open direction when the second member 2 kept under a coupled and closed condition is opened to the first member 1, an opening structure portion 6 for generating an open rotational biasing effect for automatically opening the second member 2 to a predetermined open angle position P3 relative to the first member 1, by biasing said closing structure portion 5 in the rotational direction when the second member 2 is manually rotated in the open direction exceeding the predetermined open angle position P2 to the first member 1, and a retainer member 8 for releaseably retaining to said closing structure portion 5, wherein under the condition that said retainer member 8 is retained at the closing structure portion 5, the rotation of the closing structure portion 5 by said opening structure portion 6 is prevented, when said retainer member 8 is disengaged from the closing structure portion 5, the rotation of the closing structure portion 5 by the opening structure portion 6 is allowed, and a retention force of the retainer member 8 to the closing structure portion 5 is set up so that the retainer member 8 is not disengaged from the closing structure portion 5 by the opening rotational biasing force of said opening structure portion 6 and the retainer member 8 may be disengaged from the closing structure portion 5 when the second member 2 is manually rotated in the open direction exceeding the predetermined open angle position P2 against the closing rotational biasing force by said closing structure portion 5 relative to said first member 1.

Also, the invention relates to a hinge device for pivoting a first member 1 and a second member 2 to be rotatably opened and closed, characterized by comprising a first joint member 3 coupled with the first member 1 in a rotation prevented condition and a second joint member 4 coupled relatively rotatably to the first joint member 3 and coupled with the second member 2 in a rotation prevented condition, wherein a cam portion 10 is provided to either one of the first joint member 3 and the second joint member 4, a cam engagement portion 11 which engages with the cam portion 10 is provided to the other, at least one of the cam portion 10 and the cam engagement portion 11 is provided slidably in the engagement and disengagement direction, an engagement biasing member 12 is provided for biasing at least one of the cam portion 10 and the cam engagement portion 11 in the engagement direction, when the second member 2 kept under the coupled and closed condition is opened to the first member 1, in a rotational range A1 to a predetermined open angle position P2 rotated in the open direction from the coupled and closed position P1, the cam portion 10 and the cam engagement portion 11 are biased by said engagement biasing member 12 and in dropping engagement with each other whereby a closing rotation biasing effect is generated for automatically closing the second member 2 to the coupled and closed position P1 relative to the first member 1, a rotational biasing member 13 is provided for biasing at least one of the cam portion 10 and the cam engagement portion 11 in a rotational direction, when the second member 2 is manually rotated in the open direction relative to the first member 1 exceeding the predetermined open angle position P2, the cam portion 10 and the cam engagement portion 11 are biased by the rotational biasing member 13 and are not disengaged from each other but rotated together under the engagement condition so that the open rotational biasing effect is generated for automatically opening the second member 2 to the predetermined open angle position P3 relative to the first member 1, a retainer member 8 for releaseably retaining said cam portion 10 or the cam engagement portion 111 is provided in a rotation prevented manner in either one of said first joint member 3 and said second joint member 4, under the condition that the retainer member 8 is retained at the cam portion 10 or the cam engagement portion 11, the cooperative rotation of the cam portion 10 and the cam engagement portion 11 by said rotational biasing member 13 is prevented, when the retainer member 8 is disengaged from the cam portion 10 or the cam engagement portion 11, the cooperative rotation between the cam portion 10 and the cam engagement portion 11 by the rotational biasing member 13 is allowed, and the retention force of the retainer member 8 relative to the cam portion 10 or the cam engagement portion 11 is set up to such a retention force that the retainer member 8 is not disengaged from the cam portion 10 or the cam engagement portion 11 by the biasing force of said rotational biasing member 13, and when the second member 2 is manually rotated in the opening direction exceeding the predetermined open angle position P2 against the closing rotational biasing force by the cam portion 10 and the cam engagement portion 11 relative to the first member 1, the retainer member 8 may be disengaged from the cam portion 10 or the cam engagement portion 11.

Also, the invention relates to a hinge device for pivoting a first member 1 and a second member 2 to be rotatably opened and closed, characterized by comprising a first joint member 3 coupled with the first member 1 in a rotation prevented condition and a second joint member 4 coupled relatively rotatably to the first joint member 3 and coupled with the second member 2 in a rotation prevented condition, wherein a cam portion 10 is provided to either one of the first joint member 3 and the second joint member 4, a cam engagement portion 11 which engages with the cam portion 10 is provided to the other, at least one of the cam portion 10 and the cam engagement portion 11 is provided slidably in the engagement and disengagement direction, an engagement biasing member 12 is provided for biasing at least one of the cam portion 10 and the cam engagement portion 11 in the engagement direction, when the second member 2 kept under the coupled and closed condition is opened to the first member 1, in a rotational range A1 to a predetermined open angle position P2 rotated in the open direction from the coupled and closed position P1, the cam portion 10 and the cam engagement portion 11 are biased by said engagement biasing member 12 and in dropping engagement with each other whereby a closing rotation biasing effect is generated for automatically closing the second member 2 to the coupled and closed position P1 relative to the first member 1, a rotational biasing member 13 is provided for biasing at least one of the cam portion 10 and the cam engagement portion 11 in a rotational direction, when the second member 2 is manually rotated in the open direction relative to the first member 1 exceeding the predetermined open angle position P2, the cam portion 10 and the cam engagement portion 11 are biased by the rotational biasing member 13 and are not disengaged from each other but rotated together under the engagement condition so that the open rotational biasing effect is generated for automatically opening the second member 2 to the predetermined open angle position P3 relative to the first member 1, in a rotational range A2 to the predetermined open angle position P2 rotated in the closing direction from a position where the second member 2 is opened to the first member 1, the cam portion 10 and the cam engagement portion 11 are disengaged from each other, an apex portion of the cam portion 10 and an apex portion of the cam engagement portion 11 are in abutment with each other by the bias of the engagement biasing member 12 to generate a frictional resistance to thereby generate a free stop effect for holding the second member 2 to the first member 1 at any desired open angle position, a retainer member 8 for releaseably retaining said cam portion 10 or the cam engagement portion 11 is provided in a rotation prevented manner in either one of said first joint member 3 and said second joint member 4, under the condition that the retainer member 8 is retained at the cam portion 10 or the cam engagement portion 11, the cooperative rotation of the cam portion 10 and the cam engagement portion 11 by said rotational biasing member 13 is prevented, when the retainer member 8 is disengaged from the cam portion 10 or the cam engagement portion 11, the cooperative rotation between the cam portion 10 and the cam engagement portion 11 by the rotational biasing member 13 is allowed, and the retention force of the retainer member 8 relative to the cam portion 10 or the cam engagement portion 11 is set up to such a retention force that the retainer member 8 is not disengaged from the cam portion 10 or the cam engagement portion 11 by the biasing force of said rotational biasing member 13, and when the second member 2 is manually rotated in the opening direction exceeding the predetermined open angle position P2 against the closing rotational biasing force by the cam portion 10 and the cam engagement portion 111 relative to the first member 1, the retainer member 8 may be disengaged from the cam portion or the cam engagement portion 11.

Also, the invention relates to the hinge device according to any one of claims 5 to 7, further characterized in that an engagement concave portion 9 for fitting and retaining said retainer member 8 is provided in said cam portion 10 or said cam engagement portion 11, and a taper surface 8*a* is formed in an insertion portion of the retainer member 8 to be inserted into said engagement concave portion 9 whereby a retention force of the retainer member 8 to said engagement concave portion 9 is set up to such a retention force that the retainer member 8 is disengaged from the cam portion 10 or the cam engagement portion 11 when the second member 2 is manually rotated relative to the first member 1 in the open direction exceeding the predetermined open angle position P2 against the closing rotation biasing force by the cam portion 10 and the cam engagement portion 11.

Also, the invention relates to the hinge device according to any one of claims 5 to 7, further characterized in that said retainer member 8 is slidingly moved by a depression operation of a depression button portion 26 so that the retention to said closing structure portion 5 is released.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein a closing structure portion 5 is provided in said first hinge member H1 for generating a closing rotation biasing effect for automatically closing the second member 2 to the first member 1 to a coupled and closed position P1 in a rotational range A1 to a predetermined open angle position P2 rotated in an opening direction from the coupled and closed position P1 when the second member 2 kept under the coupled and closed condition is opened relative to said first member 1, an opening structure portion 6 is provided in said second hinge member H2 for generating an opening rotation biasing effect for automatically opening the second member 2 to the first member 1 to a predetermined open angle position P3 by biasing the closing structure portion 5 in a rotational direction, a rotation preventing structure portion 7 is provided for releaseably retaining to said closing structure portion 5 and preventing the rotation of the closing structure portion 5 by the opening structure portion 6, and a depression button portion 26 is provided for releasing the retention of the rotation preventing structure portion 7 to said closing structure portion 5.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein a closing structure portion 5 is provided in said first hinge member H1 for generating a closing rotation biasing effect for automatically closing the second member 2 to the first member 1 to a coupled and closed position P1 in a rotational range A1 to a predetermined open angle position P2 rotated in an opening direction from the coupled and closed position P1 when the second member 2 kept under the coupled and closed condition is opened relative to said first member 1, an opening structure portion 6 is provided in said second hinge member H2 for generating an opening rotation biasing effect for automatically opening the second member 2 to the first member 1 to a predetermined open angle position P3 by biasing the closing structure portion 6 in a rotational direction, a free stop effect is generated for holding the second member 2 to the first member 1 at any desired open angle position in a rotational range A2 to the predetermined open angle position P2 rotated in the closing direction from a position where the second member 2 is opened to said first member 1, a rotation preventing structure 7 portion is provided for releaseably retaining to said closing structure portion 5 and preventing the rotation of the closing structure portion 5 by the opening structure portion 6, and a depression button portion 26 is provided for releasing the retention of the rotation preventing structure portion 7 to said closing structure portion.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein said first hinge member H1 is composed of a first joint member 3 coupled to the first member 1 or the second member 2 and a second joint member 4 coupled to the second member 2 or the first member 1, a closing structure portion 5 is provided in said first hinge member H1 for generating a closing rotation biasing effect for automatically closing the second member 2 to the first member 1 to a coupled and closed position P1 in a rotational range A1 to a predetermined open angle position P2 rotated in an opening direction from the coupled and closed position P1 when the second member 2 kept under the coupled and closed condition is opened relative to said first member 1, an opening structure portion 6 is provided in said second hinge member 2 for generating an opening rotation biasing effect for automatically opening the second member 2 to the first member 1 to a predetermined open angle position P3 by biasing the closing structure portion 5 in a rotational direction, a retainer member 8 for releaseably retaining to said closing structure portion 5 is provided in either one of the first joint member 3 and the second joint member 4 of said first hinge member H1, under the condition that said retainer member 8 is retained to the closing structure portion 5, the rotation of the closing structure portion 5 by said opening structure portion 6 is prevented, when said retainer member 8 is disengaged from the closing structure portion 5, the rotation of the closing structure portion 5 is allowed by the opening structure portion 6, and said retainer member 8 is slidingly moved by a depression operation of a depression button portion 26 so that the retention to said closing structure portion 5 is released.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein said first hinge member H1 is composed of a first joint member 3 coupled to the first member 1 or the second member 2 and a second joint member 4 coupled to the second member 2 or the first member 1, a cam portion 10 is provided to either one of the first joint member 3 and the second joint member 4 of said first hinge member H1, a cam engagement portion 11 which engages with the cam portion 10 is provided to the other, at least one of the cam portion 10 and the cam engagement portion 11 is provided slidably in the engagement and disengagement direction, an engagement biasing member 12 is provided for biasing at least one of the cam portion 10 and the cam engagement portion 11 in the engagement direction, when the second member 2 kept under the coupled and closed condition is opened to the first member 1, in a rotational range A1 to a predetermined open angle position P2 rotated in the open direction from the coupled and closed position P1, the cam portion 10 and the cam engagement portion 11 are biased by said engagement biasing member 12 and in dropping engagement with each other whereby a closing rotation biasing effect is generated for automatically closing the second member 2 to the coupled and closed position P1 relative to the first member 1, a rotation biasing member 13 is provided in said second hinge member H2 for biasing at least one of the cam portion 10 and the cam engagement portion 11 in a rotational direction, the cam portion 10 and the cam engagement portion 11 are biased by the rotational biasing member 13 and are not disengaged from each other but rotated together under the engagement condition so that the open rotational biasing effect is generated for automatically opening the second member 2 to the predetermined open angle position P3 relative to the first member 1, a retainer member 8 for releaseably retaining said cam portion 10 or the cam engagement portion 11 is provided in either one of said first joint member 3 and said second joint member 4 of said first hinge member H1, under the condition that the retainer member 8 is retained at the cam portion 10 or the cam engagement portion 11, the cooperative rotation of the cam portion 10 and the cam engagement portion 111 by said rotation biasing member 13 is prevented, when the retainer member 8 is disengaged from the cam portion 10 or the cam engagement portion 11, the cooperative rotation between the cam portion 10 and the cam engagement portion 11 by the rotational biasing member 13 is allowed, and said retainer member 8 is slidingly moved by a depression operation of a depression button portion 26 provided in either one of the first joint member 3 and the second joint member 4 so that the retention to said cam portion 10 or the cam engagement portion 11 is released.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein said first hinge member H1 is composed of a first joint member 3 coupled to the first member 1 or the second member 2 and a second joint member 4 coupled to the second member 2 or the first member 1, a cam portion 10 is provided to either one of the first joint member 3 and the second joint member 4 of said first hinge member H1, a cam engagement portion 11 which engages with the cam portion 10 is provided to the other, at least one of the cam portion 10 and the cam engagement portion 11 is provided slidably in the engagement and disengagement direction, an engagement biasing member 12 is provided for biasing at least one of the cam portion 10 and the cam engagement portion 11 in the engagement direction, when the second member 2 kept under the coupled and closed condition is opened relative to said first member 1, in a rotational range A1 to a predetermined open angle position P2 rotated in the open direction from the coupled and closed position P1, the cam portion 10 and the cam engagement portion 11 are biased by said engagement biasing member 12 and in dropping engagement with each other whereby a closing rotation biasing effect is generated for automatically closing the second member 2 to the coupled and closed position P1 relative to the first member 1, a rotational biasing member 13 is provided in said second hinge member H2 for biasing at least one of the cam portion 10 and the cam engagement portion 11 in a rotational direction, the cam portion 10 and the cam engagement portion 11 are biased by the rotational biasing member 13 and are not disengaged from each other but rotated together under the engagement condition so that the open rotational biasing effect is generated for automatically opening the second member 2 to the predetermined open angle position P3 relative to the first member 1, in a rotational range A2 to the predetermined open angle position P2 rotated in the closing direction from a position where the second member 2 is opened to the first member 1, the cam portion 10 and the cam engagement portion 11 are disengaged from each other, an apex portion of the cam portion 10 and an apex portion of the cam engagement portion 111 are in abutment with each other by the bias of the engagement biasing member 12 to generate a frictional resistance to thereby generate a free stop effect for holding the second member 2 to the first member 1 at any desired open angle position, a retainer member 8 for releaseably retaining said cam portion 10 or the cam engagement portion 11 is provided in either one of said first joint member 3 and said second joint member 4 of said first hinge member H1, under the condition that the retainer member 8 is retained at the cam portion 10 or the cam engagement portion 11, the cooperative rotation of the cam portion 10 and the cam engagement portion 11 by said rotation biasing member 13 is prevented, when the retainer member 8 is disengaged from the cam portion 10 or the cam engagement portion 11, the cooperative rotation between the cam portion 10 and the cam engagement portion 11 by the rotational biasing member 13 is allowed, and said retainer member 8 is slidingly moved by a depression operation of a depression button portion 26 provided in either one of the first joint member 3 and the second joint member 4 so that the retention to said cam portion 10 or the cam engagement portion 11 is released.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein a closing structure portion 5 is provided in said first hinge member H1 for generating a closing rotation biasing effect for automatically closing the second member 2 to the first member 1 to a coupled and closed position P1 in a rotational range A1 to a predetermined open angle position P2 rotated in an opening direction from the coupled and closed position P1 when the second member 2 kept under the coupled and closed condition is opened relative to said first member 1, and an opening structure portion 6 is provided in said second hinge member H2 for generating an opening rotation biasing effect for automatically opening the second member 2 to the first member 1 to a predetermined open angle position P3 by biasing the closing structure portion 5 in a rotational direction when the second member 2 is manually rotated in the opening direction exceeding the predetermined open angle position P2 relative to the first member 1.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein a closing structure portion 5 is provided in said first hinge member H1 for generating a closing rotation biasing effect for automatically closing the second member 2 to the first member 1 to a coupled and closed position P1 in a rotational range A1 to a predetermined open angle position P2 rotated in an opening direction from the coupled and closed position P1 when the second member 2 kept under the coupled and closed condition is opened relative to said first member 1, an opening structure portion 6 is provided in said second hinge member H2 for generating an opening rotation biasing effect for automatically opening the second member 2 to the first member 1 to a predetermined open angle position P3 by biasing the closing structure portion 5 in a rotational direction when the second member 2 is manually rotated in the opening direction exceeding the predetermined open angle position P2 relative to the first member 1, and a free stop effect is generated for holding the second member 2 to the first member 1 at any desired open angle position in a rotational range A2 to the predetermined open angle position P2 rotated in the closing direction from a position where the second member 2 is opened to said first member 1.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein a closing structure portion 5 is provided in said first hinge member H1 for generating a closing rotation biasing effect for automatically closing the second member 2 to the first member 1 to a coupled and closed position P1 in a rotational range A1 to a predetermined open angle position P2 rotated in an opening direction from the coupled and closed position P1 when the second member 2 kept under the coupled and closed condition is opened relative to said first member 1, an opening structure portion 6 is provided in said second hinge member H2 for generating an opening rotation biasing effect for automatically opening the second member 2 to the first member 1 to a predetermined open angle position P3 by biasing said closing structure portion 5 in a rotational direction when the second member 2 is manually rotated in the open direction exceeding the predetermined open angle position P2 relative to said first member 1, a rotation preventing structure portion 7 is provided for releaseably retaining to said closing structure portion 5 and preventing the rotation of the closing structure portion 5 by said opening structure portion 6, and a retention force of the rotation preventing structure portion 7 to the closing structure portion 5 is set up so that the rotation preventing structure portion 7 is not disengaged from the closing structure portion 5 by the opening rotational biasing force of said opening structure portion 6 and the rotation preventing structure portion 7 may be disengaged from the closing structure portion 5 when the second member 2 is manually rotated in the open direction exceeding the predetermined open angle position P2 against the closing rotational biasing force by said closing structure portion 5 relative to said first member 1.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein said first hinge member H1 is composed of a first joint member 3 coupled with the first member 1 or the second member 2 and a second joint member 4 coupled with the second member 2 or the first member 1, a closing structure portion 5 is provided in said first hinge member H1 for generating a closing rotation biasing effect for automatically closing the second member 2 to the first member 1 to a coupled and closed position P1 in a rotational range A1 to a predetermined open angle position P2 rotated in an opening direction from the coupled and closed position P1 when the second member 2 kept under the coupled and closed condition is opened relative to said first member 1, an opening structure portion 6 is provided in said second hinge member H2 for generating an opening rotation biasing effect for automatically opening the second member 2 to the first member 1 to a predetermined open angle position P3 by biasing said closing structure portion 5 in a rotational direction when the second member 2 is manually rotated in the open direction exceeding the predetermined open angle position P2 relative to said first member 1, a retainer member 8 for releaseably retaining to said closing structure portion is provided in either one of the first joint member 3 and the second joint member 4 of said first hinge member H1, under the condition that said retainer member 8 is retained to the closing structure portion 5, the rotation of the closing structure portion 5 by said opening structure portion 6 is prevented, when said retainer member 8 is disengaged from the closing structure portion 5, the rotation of the closing structure portion 5 is allowed by the opening structure portion 6, and a retention force of the retainer member 8 to the closing structure portion 5 is set up so that the retainer member 8 is not disengaged from the closing structure portion 5 by the opening rotational biasing force of said opening structure portion 6 and the retainer member 8 may be disengaged from the closing structure portion 5 when the second member 2 is manually rotated in the open direction exceeding the predetermined open angle position P2 against the closing rotational biasing force by said closing structure portion 5 relative to said first member 1.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein said first hinge member H1 is composed of a first joint member 3 coupled with the first member 1 or the second member 2 and a second joint member 4 coupled with the second member 2 or the first member 1, a cam portion 10 is provided to either one of the first joint member 3 and the second joint member 4 of said first hinge member H1, a cam engagement portion 11 which engages with the cam portion 10 is provided to the other, at least one of the cam portion 10 and the cam engagement portion 11 is provided slidably in the engagement and disengagement direction, an engagement biasing member 12 is provided for biasing at least one of the cam portion 10 and the cam engagement portion 11 in the engagement direction, when the second member 2 kept under the coupled and closed condition is opened to the first member 1, in a rotational range A1 to a predetermined open angle position P2 rotated in the open direction from the coupled and closed position P1, the cam portion 10 and the cam engagement portion 11 are biased by said engagement biasing member 12 and in dropping engagement with each other whereby a closing rotation biasing effect is generated for automatically closing the second member 2 to the coupled and closed position P1 relative to the first member 1, a rotation biasing member 13 is provided in said second hinge member H2 for biasing at least one of the cam portion 10 and the cam engagement portion 11 in a rotational direction, when the second member 2 is manually rotated in the open direction exceeding to the predetermined open angle position P2 relative to the first member 1, the cam portion 10 and the cam engagement portion 111 are biased by the rotational biasing member 13 and are not disengaged from each other but rotated together under the engagement condition so that the open rotational biasing effect is generated for automatically opening the second member 2 to the predetermined open angle position P3 relative to the first member 1, a retainer member 8 for releaseably retaining said cam portion 10 or the cam engagement portion 11 is provided in either one of said first joint member 3 and said second joint member 4 of said first hinge member H1, under the condition that the retainer member 8 is retained at the cam portion 10 or the cam engagement portion 11, the cooperative rotation of the cam portion 10 and the cam engagement portion 11 by said rotational biasing member 13 is prevented, when the retainer member 8 is disengaged from the cam portion 10 or the cam engagement portion 11, the cooperative rotation between the cam portion 10 and the cam engagement portion 11 by the rotational biasing member 13 is allowed, a retention force of the retainer member 8 to said cam portion 10 or said cam engagement portion 11 is set up so that the retainer member 8 is not disengaged from the cam portion 10 or the cam engagement portion 11 by the biasing force of said rotational biasing member 13, and the retainer member 8 may be disengaged from the cam portion 10 or the cam engagement portion 111 when the second member 2 is manually rotated in the open direction exceeding the predetermined open angle position P2 against the closing rotational biasing force by said cam portion 10 and said cam engagement portion 11 relative to said first member 1.

Also, the invention relates to a hinge device for pivoting a first member 1 and a second member 2 to be rotatably opened and closed, characterized by comprising a first hinge member H1 provided in a first pivot portion 25A provided in either one of right and left positions of a pivot joint portion 25 between said first member 1 and said second member 2 and a second hinge member H2 provided in a second pivot portion 25B provided in the other position, wherein said first hinge member H1 is composed of a first joint member 3 coupled with the first member 1 or the second member 2 and a second joint member 4 coupled with the second member 2 or the first member 1, a cam portion 10 is provided to either one of the first joint member 3 and the second joint member 4 of said first hinge member H1, a cam engagement portion 11 which engages with the cam portion 10 is provided to the other, at least one of the cam portion 10 and the cam engagement portion 11 is provided slidably in the engagement and disengagement direction, an engagement biasing member 12 is provided for biasing at least one of the cam portion 10 and the cam engagement portion 11 in the engagement direction, when the second member 2 kept under the coupled and closed condition is opened to the first member 1, in a rotational range A1 to a predetermined open angle position P2 rotated in the open direction from the coupled and closed position P1, the cam portion 10 and the cam engagement portion 11 are biased by said engagement biasing member 12 and in dropping engagement with each other whereby a closing rotation biasing effect is generated for automatically closing the second member 2 to the coupled and closed position P1 relative to the first member 1, a rotational biasing member 13 is provided in said second hinge member H2 for biasing at least one of the cam portion 10 and the cam engagement portion 11 in a rotational direction, when the second member 2 is manually rotated in the open direction exceeding to the predetermined open angle position P2 relative to the first member 1, the cam portion 10 and the cam engagement portion 111 are biased by the rotational biasing member 13 and are not disengaged from each other but rotated together under the engagement condition so that the open rotational biasing effect is generated for automatically opening the second member 2 to the predetermined open angle position P3 relative to the first member 1, in a rotational range A2 to the predetermined open angle position P2 rotated in the closing direction from a position where the second member 2 is opened to the first member 1, the cam portion 10 and the cam engagement portion 11 are disengaged from each other, an apex portion of the cam portion 10 and an apex portion of the cam engagement portion 11 are in abutment with each other by the bias of the engagement biasing member 12 to generate a frictional resistance to thereby generate a free stop effect for holding the second member 2 to the first member 1 at any desired open angle position, a retainer member 8 for releaseably retaining said cam portion 10 or the cam engagement portion 111 is provided in either one of said first joint member 3 and said second joint member 4 of said first hinge member H1, under the condition that the retainer member 8 is retained at the cam portion 10 or the cam engagement portion 11, the cooperative rotation of the cam portion 10 and the cam engagement portion 11 by said rotation biasing member 13 is prevented, when the retainer member 8 is disengaged from the cam portion 10 or the cam engagement portion 11, the cooperative rotation between the cam portion 10 and the cam engagement portion 11 by the rotational biasing member 13 is allowed, a retention force of the retainer member 8 to said cam portion 10 or said cam engagement portion 111 is set up so that the retainer member 8 is not disengaged from the cam portion or the cam engagement portion by the biasing force of said rotational biasing member 13 and the retainer member 8 may be disengaged from the cam portion 10 or the cam engagement portion 111 when the second member 2 is manually rotated in the open direction exceeding the predetermined open angle position P2 against the closing rotational biasing force by said cam portion 10 and said cam engagement portion 11 relative to said first member.

Also, the invention relates to an electronic equipment using the hinge device according to any one of claims 18 to 20, further characterized in that an engagement concave portion 9 for fitting and retaining said retainer member 8 is provided in said cam portion 10 or said cam engagement portion 11, and a taper surface 8a is formed in an insertion portion of the retainer member 8 to be inserted into said engagement concave portion 9 whereby a retention force of the retainer member 8 to said engagement concave portion 9 is set up to such a retention force that the retainer member 8 is disengaged from the cam portion 10 or the cam engagement portion 11 when the second member 2 is manually rotated relative to the first member 1 in the open direction exceeding the predetermined open angle position P2 against the closing rotation biasing force by the cam portion 10 and the cam engagement portion 11.

Also, the invention relates to the hinge device according to any one of claims 1 to 7 and 10 to 20, further characterized in that a body portion provided with an operating portion 14 and a joint portion provided with a display image field 15 are coupled with each other and disposed to cover the operating portion 14 when said operating portion 14 is not operative, having a hinge device for coupling said body portion and said joint portion rotatably so that said joint portion is rotated horizontally or in a rising manner from the coupled condition to expose the operating portion or the joint portion may be rotated around its own axis to be turned inside out, wherein said body portion is used as said first member 1 or said second member 2 and said joint portion is used as said second member 2 or said first member 1 in this hinge device.

With the above-described structure, it is possible to provide a novel hinge device that may enhance remarkably the operationability of the commercial product produced by pivotally coupling the first member and second member such as performing extremely easily and quickly the opening operation.

Also, in the case where a hinge structure (double hinge structure) composed of the first hinge member and the second hinge member are adopted as the hinge device arranged in a pivot joint portion between the first member and the second member, the pivot joint portion between the first member and the second member for arranging this hinged device is divided right and left and each pivot portion (first pivot portion and second pivot portion) may be reduced in size so that a vacant space may be produced between the right and left pivot portions. It is therefore possible to keep a sufficient space, for example, to arrange wirings for electrically connecting electronic parts disposed in the first member and electronic parts disposed in the second member to each other. In addition, it is possible to provide a novel hinge device that may enhance remarkably the operationability of the commercial product produced by pivotally coupling the first member and second member such as performing extremely easily and quickly the opening operation.

BEST MODE FOR EMBODYING THE INVENTION

A best possible mode for embodying the invention (how to embody the invention in the best mode) will now be described in brief on the basis of the drawings while showing the operational effect of the present invention.

According to the present invention, when a second member 2 kept under the coupled and closed condition is opened to a first member 1, in a rotational range A1 from the coupled and closed position P1 to a predetermined open angle position P2 rotated in the open direction, a closing rotational biasing effect is generated to automatically close the second member 2 to the coupled and closed position P1 relative to the first member 1. Also, when the second member 2 is manually rotated in the open direction relative to the first member 1 exceeding the above-described predetermined open angle position P2, an open rotational biasing effect is generated to automatically open the second member 2 up to a predetermined open angle position P3 relative to the first member 1.

Namely, when the second member 2 is manually rotated in the opening direction exceeding the predetermined open angle position P2 relative to the first member 1, the second member 2 is automatically opened to the predetermined open angle position P3.

Accordingly, in the case where the hinge device according to the present invention is applied to, for example, the above-described collapsible type portable electronic equipment which is constituted by pivotally coupling the body portion and the joint portion with each other, for example, a finger of a hand holding the phone is inserted between the body portion and the joint portion in use so that the joint portion is rotated in the open direction relative to the body portion and the joint portion is automatically opened due to the open rotational biasing effect. Thus, the opening operation of the joint portion may readily and quickly be attained, which is extremely useful.

Also, in the case where, in the rotational range A2 from the position where the second member 2 is opened relative to the first member 1 to the above-described predetermined open angle position P2 rotated in the closing direction, a free stop effect is generated to hold the second member 2 in any desired open angle position relative to the first member 1, it is possible to use the phone while stopping the second member 2 relative to the first member 1 in any desired angle of the phone which is easy to use. This is much more useful.

Embodiment 1

A specific embodiment 1 of the present invention will be described with reference to FIGS. 1 to 16.

Figure 1:
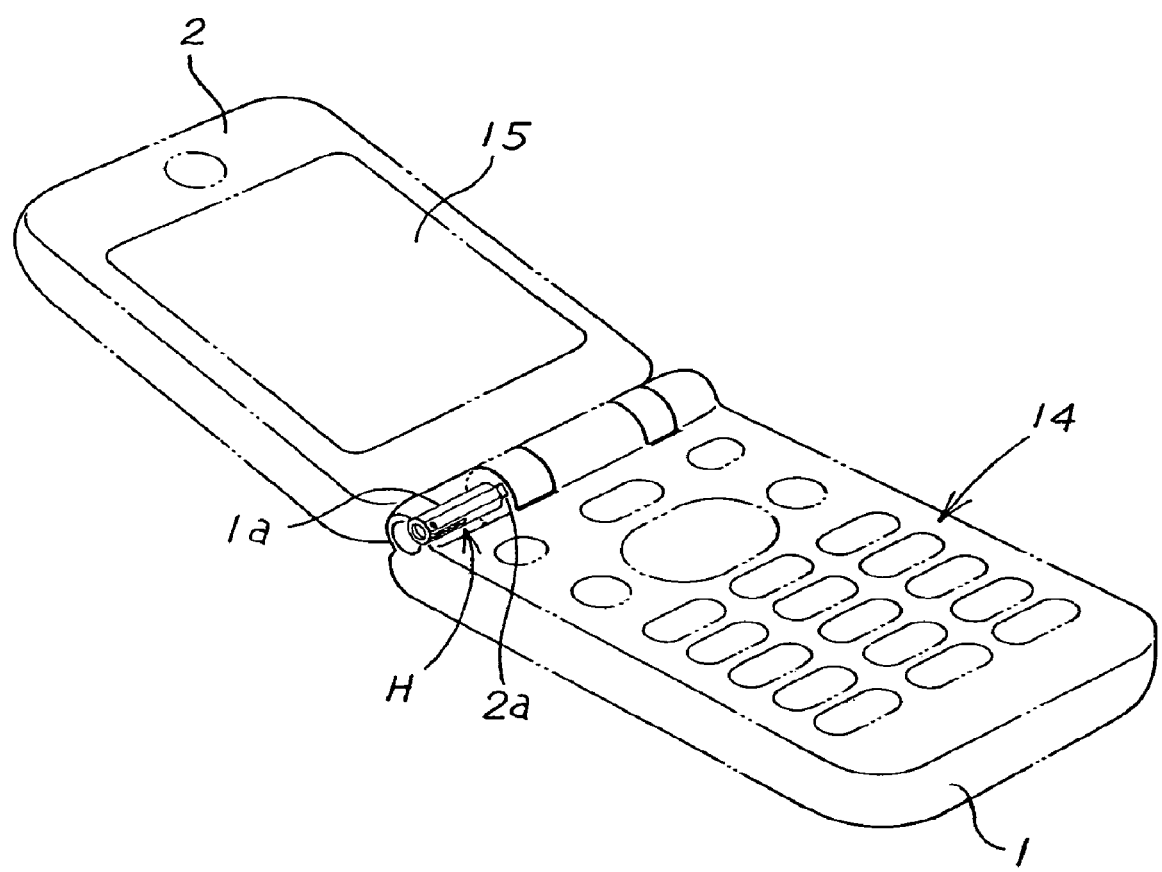
FIG. 1 is an illustrative view of use condition of a first embodiment.
Figure 2:
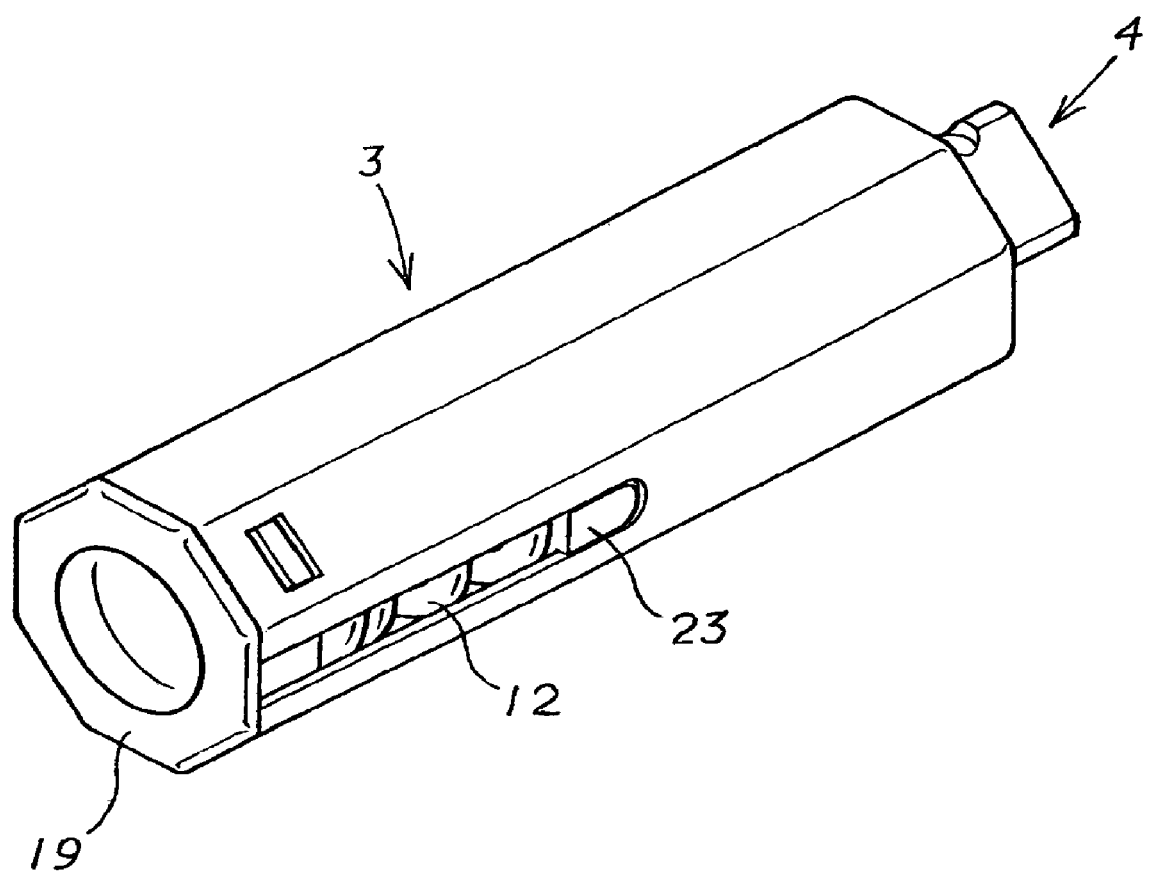
FIG. 2 is a perspective view showing the first embodiment.
Figure 3:
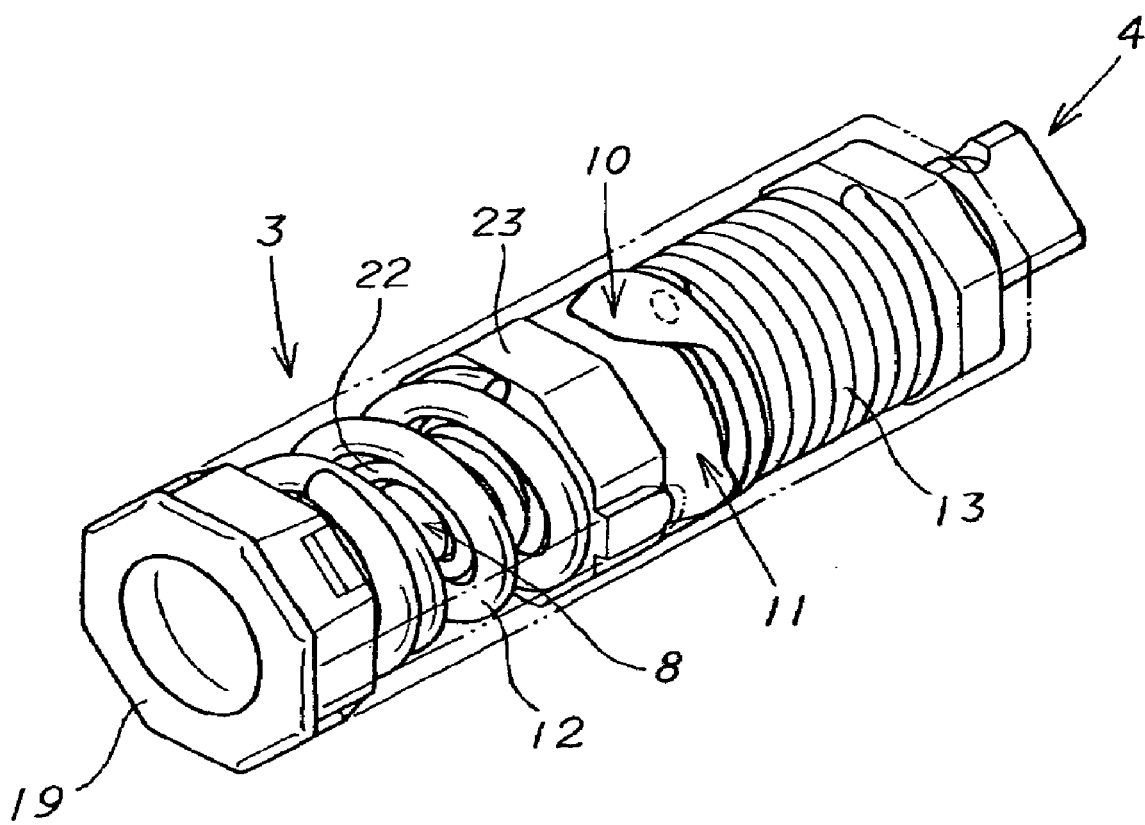
FIG. 3 is an illustrative view of a primary part of the first embodiment.
Figure 4:
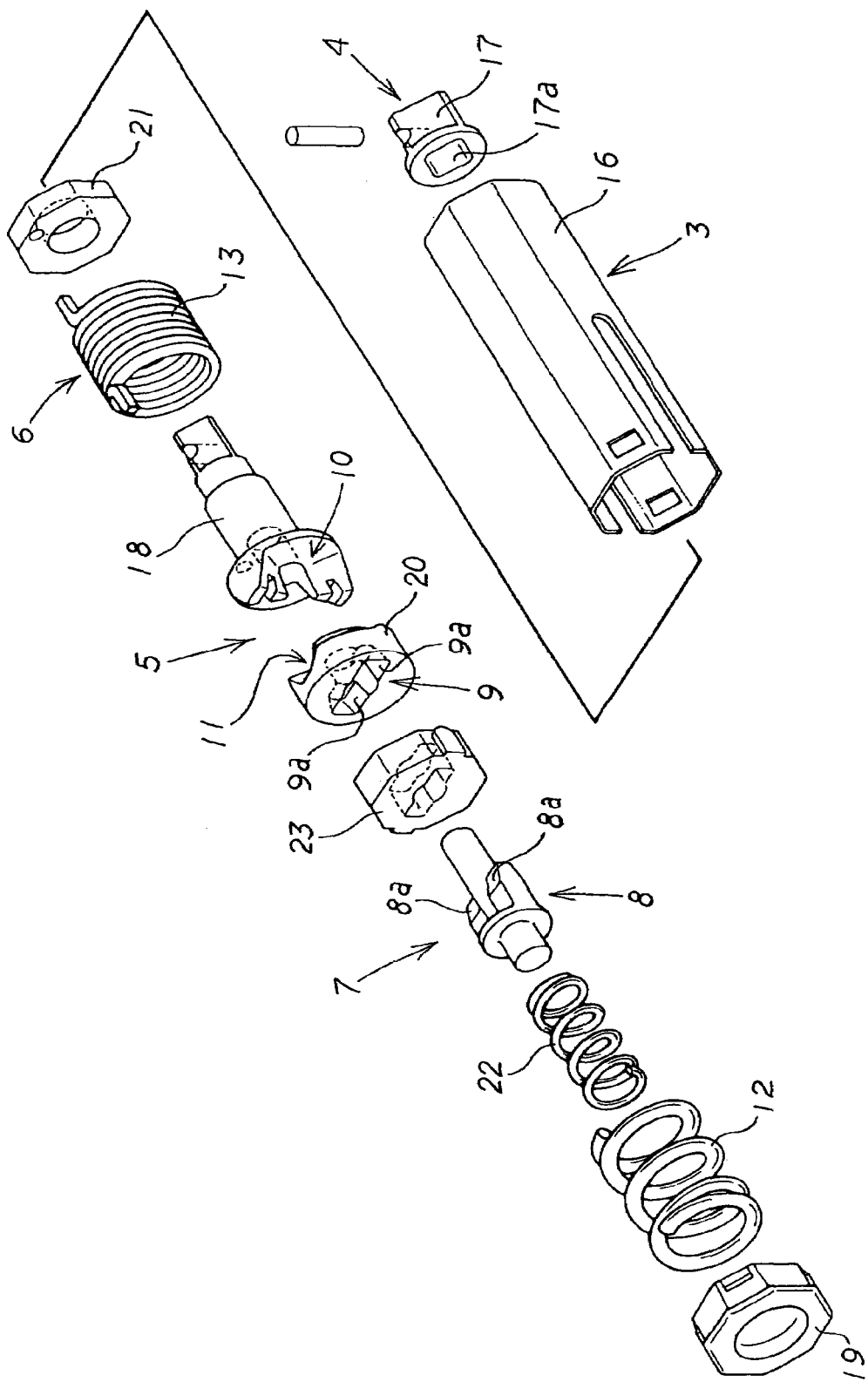
FIG. 4 is an exploded perspective view of the first embodiment.
Figure 5:
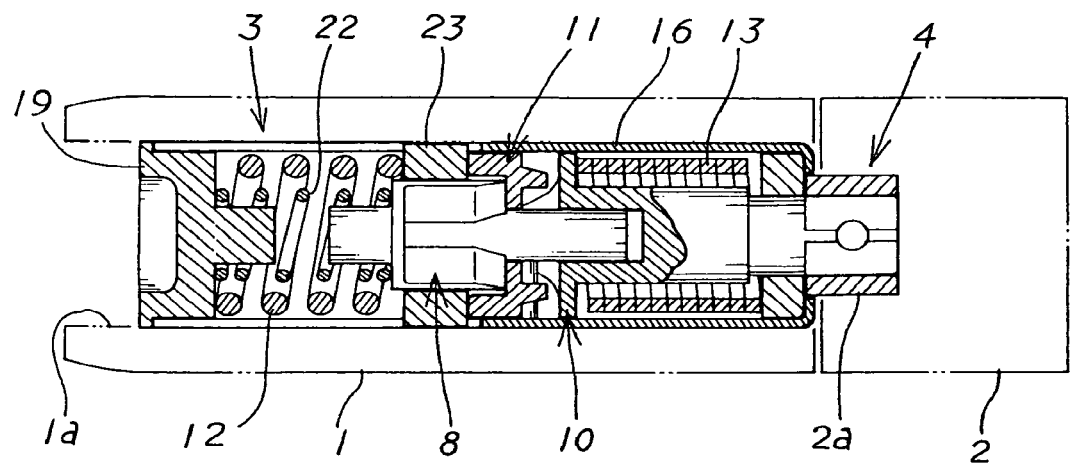
FIG. 5 is an illustrative cross-sectional view of the primary part of the first embodiment.
Figure 6:
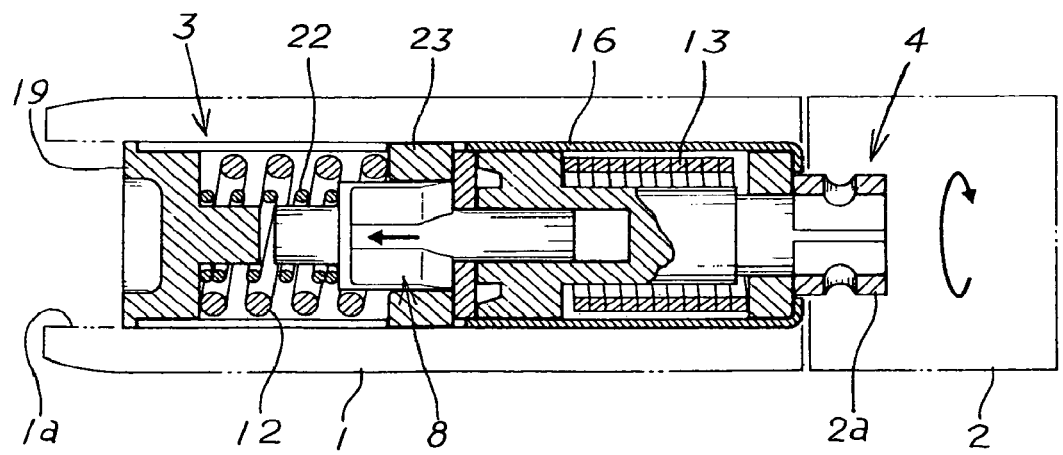
FIG. 6 is an illustrative cross-sectional view of the primary part of the first embodiment.
Figure 7:
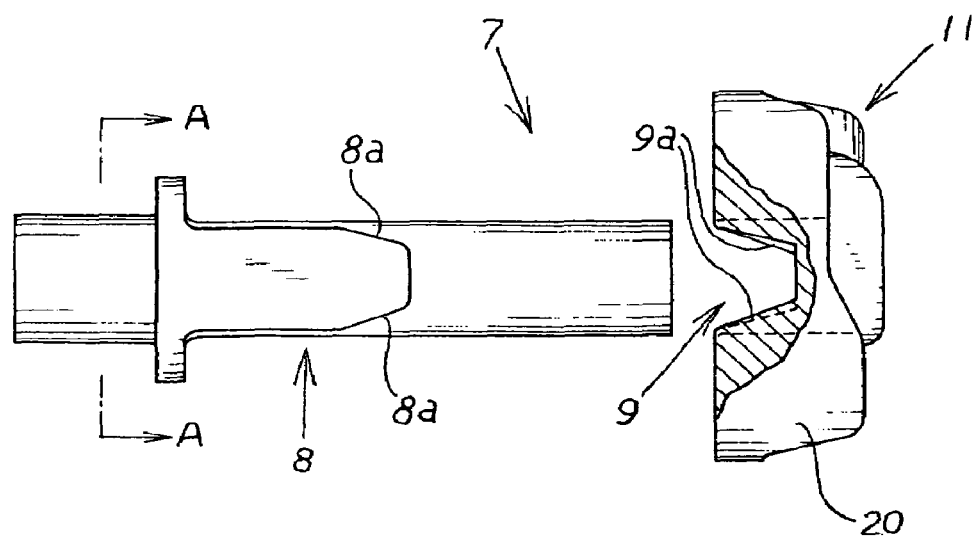
FIG. 7 is an illustrative view of the primary part of the first embodiment.
Figure 10:
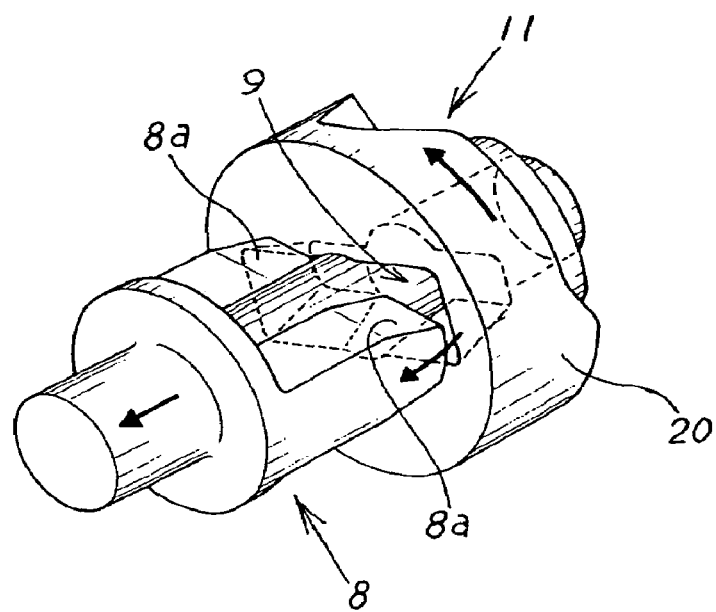
FIG. 10 is an illustrative view of the primary part of the first embodiment.
Figure 8:
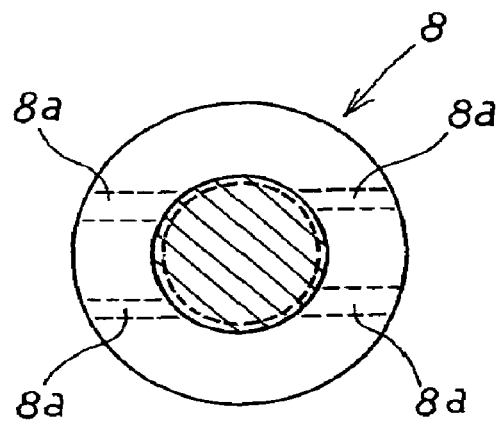
FIG. 8 is a cross-sectional view taken along the line A-A of FIG. 7.
Figure 9:
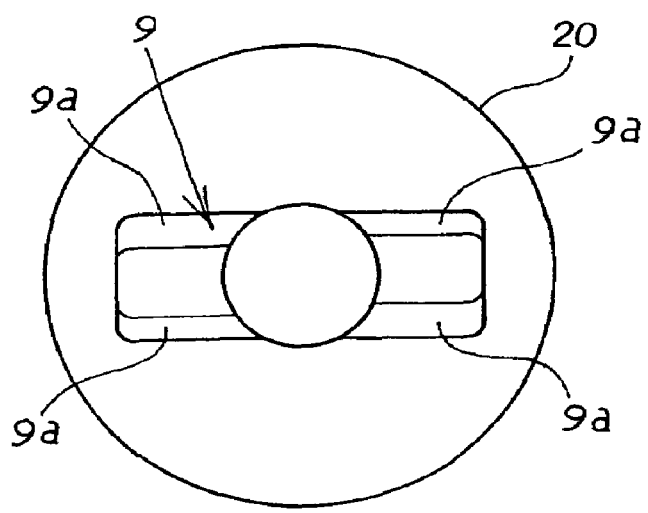
FIG. 9 is an end view of the primary part of the first embodiment.
Figure 12:
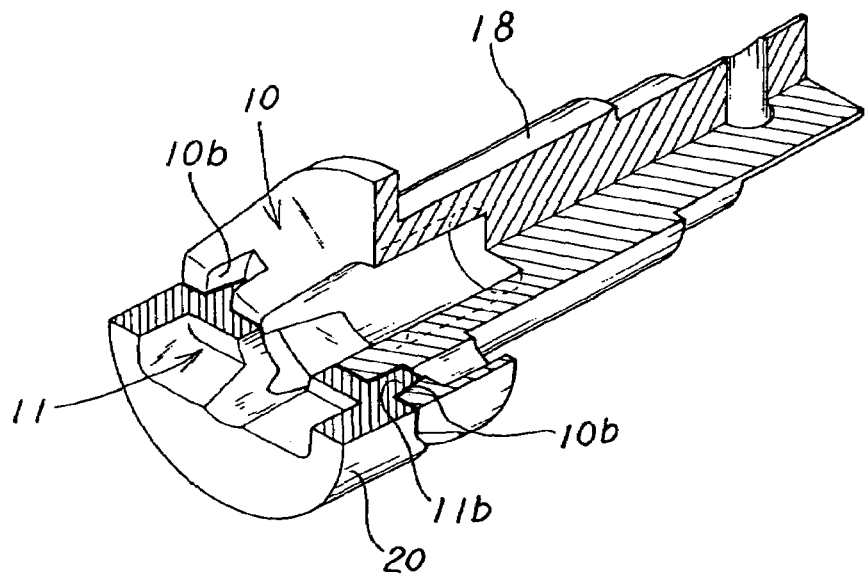
FIG. 12 is an illustrative cross-sectional view of the primary part of the first embodiment.

The embodiment 1 shows the case where a hinge device H according to the present invention is applied to a collapsible type portable phone as shown in FIG. 1. The hinge device H according to the present invention is applied to a pivot mechanism in which a body portion provided with an operating portion 14 is used as a first member 1 and a joint portion provided with a display image field 15 is used as a second member 2 to make it possible to take the condition from the closed condition where the first member 1 and the second member 2 are coupled with each other to the open condition (busy condition) where the second member 2 is rotated to, for example, 120 degrees.

Figure 16:
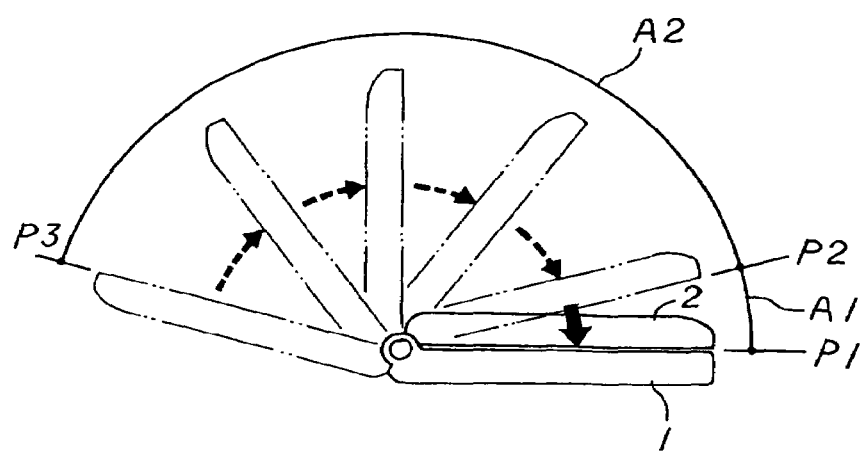
FIG. 16 is a schematic view of the operation of the first embodiment.

Then, when the second member 2 kept under the coupled and closed condition is opened to a first member 1, in a rotational range A1 from the coupled and closed position P1 to a predetermined open angle position P2 rotated in the open direction, a closing rotational biasing effect is generated to automatically close the second member 2 to the coupled and closed position P1 relative to the first member 1 (see FIG. 15), when the second member 2 is manually rotated in the open direction relative to the first member 1 exceeding the above-described predetermined open angle position P2, an open rotational biasing effect is generated to automatically open the second member 2 at once up to a predetermined open angle position P3 (maximum open angle position) relative to the first member 1 (see FIG. 15), and furthermore, in a rotational range A2 from the position where the second member 2 is opened to the first member 1 to the above-described predetermined open angle position P2 rotated in the closing direction, when the hand is released from the second member 2, the second member 2 stops in the released position to realize a free stop condition without any shake (see FIG. 16).

More specifically, in the present embodiment, a mounting hole 1a is provided in a proximal portion of the first member 1, a mounting hole 2a is provided adjacent to and in communication with the mounting hole 1a also in a proximal portion of the second member 2, and the hinge device H according to the present invention constituted into an axial part is applied to the mounting holes 1a, 2a, respectively.

A casing 16 is fixed to the body portion 1 (first member) as a joint portion constituting a part of a first joint member 3 having a rotation preventing shape through the above-described mounting hole 1a, and a member disposed in an exposed condition on one end side of this casing 16 is fixed as a mounting portion 17 constituting a part of a second joint member 4 through the mounting hole 2a to the joint portion 2 (second member) under the rotation prevented condition. This casing 16 has an octagonal shape in cross section as shown. This is adapted to attain the firm rotation preventing structure to the body portion 1. At the same time, the octagonal shape is adapted as a shape which allows the parts to be received effectively in its interior while providing the rotation preventing structure.

An axial member 18 is provided at an inner hole 17a of the above-described mounting portion 17 under the rotation prevented condition to constitute the second joint member 4 provided with a cam portion 10 at its tip end portion.

The axial member 18 relating to this second joint member 4 is adapted so that the cam portion 10 is disposed rotatably within the casing 16 relating to the first joint member 3.

A closing member 19 is disposed on the other end side of the casing 16 relating to the first joint member 3, and furthermore, an engagement member 20 having a cam engagement portion 11 facing and engaging the cam portion 10 of the above-described second joint member 4 in a concave and convex manner is provided within the casing 16. This engagement member 20 is provided rotatably within the casing 16 and at the same time provided slidably in the engagement and disengagement direction within the casing 16.

A coiled spring 12 for biasing in the engaging direction is provided as an engagement biasing member 12 within the casing 16 between the engagement member 20 having this cam engagement portion 11 and the closing member 19.

When the joint portion 2 kept under the coupled and closed condition is opened to the body portion 1 by this engagement biasing member 12, in the rotational range A1 from the coupled and closed position P1 to the predetermined open angle position P2 rotated in the open direction, the cam portion 10 and the cam engagement portion 11 are slipped down and engaged with each other by biasing by the engagement biasing member 12 so that the closing rotational biasing effect for automatically closing the joint portion 2 up to the coupled and closed position P1 relative to the body portion 1 is generated. (This is referred to as the closing structure portion 5 in the claims.)

On the other hand, a torque spring 13 is provided as a rotational biasing member 13 to the axial member 18 having the cam portion 10, the other end portion of the rotational biasing member 13 is coupled with a joint member 21 to be disposed under a rotation prevented condition within the casing 16, and accordingly, a biasing force for urging the rotational biasing member 16 to rotate the casing 16 in turn functions as a biasing force for rotating the axial member 18 (cam portion 10) by keeping the condition that the casing 16 is fixed.

When the joint portion 2 is manually rotated to the body portion 1 exceeding the predetermined open angle position P2 in the opening direction by this rotational biasing member 13, the cam portion 10 and the cam engagement portion 11 are biased by the rotational biasing member 13 and rotated together under the engagement condition without disengagement there between as a closing structure portion 5 so that the open rotational biasing effect is generated to automatically release the joint portion 2 up to the predetermined open angle position P3 relative to the body portion 1. (This is referred to as an opening structure portion 6 in the claims.)

Also, the cam engagement portion 11 is structured so that V-shaped concave portions are formed at diametrically 180 degree opposite positions, these concave portions are used as engagement portions with which the above-described cam portion 10 engages, and an apex portion (end face portion) of the cam portion 10 is brought into contact with an apex portion (end face portion) between the concave portions in the range of disengagement by the pressure force by the engagement biasing member 12.

In the present embodiment, a frictional resistance increasing means is provided for increasing a frictional resistance between the apex portion of the cam portion 10 and the apex portion of the cam engagement portion 11, and when the apex portion of the cam portion 10 and the apex portion of the cam engagement portion 11 are brought into abutment with each other, the engagement is held at a stop position by the increase of the rotational resistance due to the frictional resistance increasing means and the pressure force of the engagement biasing member 12 so far as the members are not moved by hands even if the rotational biasing force of the rotational biasing member 13 is applied.

Namely, the frictional resistance increasing means is structured so that the abutment area between the apex portion of the cam portion 10 and the apex portion of the cam engagement portion 11 is formed to be increased, whereby the frictional resistance between the apex portion of the cam portion 10 and the apex portion of the cam engagement portion 11 which are brought into pressing contact with each other by the biasing force of the engagement biasing member 12 is increased to realize the free stop. In the present embodiment, in the rotational range A2 from the position where the joint portion 2 is opened at maximum relative to the body portion 1 to the above-described predetermined open angle position P2 where the joint portion is rotated in the closed position, the free stop effect is generated for holding the joint portion 2 at any desired open angle position relative to the body portion 1.

More specifically, the sliding convex strips 11b each having a length in the rotational direction of the cam engagement portion 11 are provided in the convex portion of the cam engagement portion 11 and sliding concave grooves 10b with which the sliding convex strips 11b are brought into abutment and engagement are provided in the above-described cam portion 10 whereby the abutment area between the apex portion 10a of the cam portion 10 and the apex portion 11a of the cam engagement portion 11 is increased and the frictional resistance between the apex portion 10a of the cam portion 10 and the apex portion 11a of the cam engagement portion 11 is enhanced.

Also, in the present embodiment, the above-described sliding convex strips 11b each having a length in the rotational direction of this apex portion 11a are provided substantially in the whole range of the apex portion 11a of the engagement cam 11 whereby substantially in the whole range where the above-described cam portion 10 is disengaged from the cam engagement portion 11 and the apex portion 10a of the cam portion 10 and the apex portion 11a of the cam engagement portion 11 are brought into contact with each other, the sliding convex strips 11b are in abutment and engagement with the sliding concave grooves 10b under the abutment condition.

Figure 11:
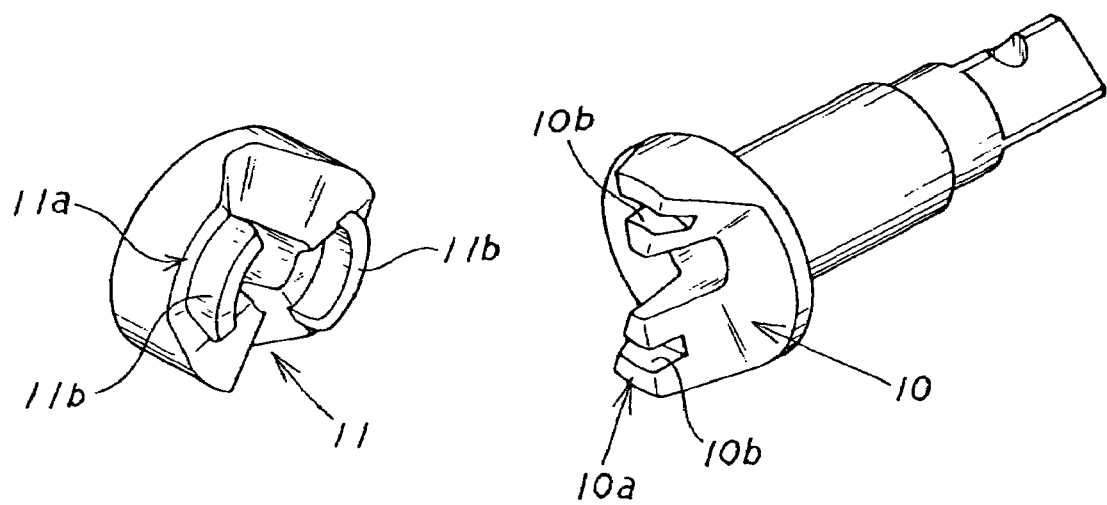
FIG. 11 is an exploded perspective view of the primary part of the first embodiment.

More specifically, as shown in FIG. 11, the sliding convex strips 11b are formed into arcuate shapes having a center at the center of the cam engagement portion 11 substantially in the middle in the diametrical direction of the apex portion 11a of the cam engagement portion 11 and are formed into convex strips each having a length in the rotational direction of the apex portion 11a of the cam engagement portion 11.

Also, the sliding convex strips 11b and the sliding concave grooves 10b are formed into concave and convex shapes whose substantially whole surface portions are to be kept in abutment in the coupling engagement whereby the abutment areas of the apex portion 10a of the cam portion 10 and the apex portion 11a of the cam engagement portion 11 are increased to enhance the frictional resistance to make it possible to realize an extremely excellent free stop.

Namely, in the present embodiment, the extremely excellent free stop operation may be exhibited substantially in the whole rotational range where the cam engagement portion 11 is disengaged from the cam portion 10 and the apex portion 11a of the cam engagement portion 11 and the apex portion 10a of the cam portion 10 are brought into abutment with each other.

Also, in the present embodiment, a rotation preventing structure portion 7 is provided for releaseably engaging with the above-described closing structure portion 5 and for preventing the closing structure portion 5 from rotating in the open direction by the opening structure portion 6.

More specifically, in this rotation preventing structure portion 7, the retainer member 8 for engaging and disengaging the engagement concave portion 9 provided in the cam engagement portion 11 is provided in the casing 16 constituting the first joint member 3. The retainer member 8 is provided slidably away from the engagement direction under the rotation prevented condition through the joint member 23 and at the same time biased in the engagement direction by the engagement biasing member 22 as the coiled spring 22 for biasing in the engagement direction.

Also, the retainer member 8 is structured so that under the engagement condition with the cam engagement portion 11, the cooperative rotation between the cam portion 10 and the cam engagement portion 11 by the rotational biasing member 13 is prevented, at the same time, when this retainer member 8 is disengaged from the cam engagement portion 11, the cooperative rotation between the cam portion 10 and the cam engagement portion 11 is allowed by the rotational biasing member 13, and the engagement force of the retainer member 8 to this engagement portion 11 is set up to such an engagement force that the retainer member 8 is not disengaged from the cam engagement portion 11 by the biasing force of the rotational biasing member 13, and when the joint portion 2 is manually rotated in the opening direction relative to the body portion 1 exceeding the predetermined open angle position P2 against the closing rotational biasing force by the cam portion 10 and the cam engagement portion 11, the retainer member 8 may be disengaged from the cam engagement portion 11.

More specifically, in the retainer member 8, taper surfaces 8a are formed at a tip end insertion portion to be inserted into the engagement concave portion 9, and by the angle setup of these taper surfaces 8a, when the joint portion 2 is manually rotated in the opening direction relative to the body portion 1 exceeding the predetermined open angle position P2 against the closing rotational biasing force by the cam portion 10 and the cam engagement portion 11, the engagement force is set up to such an engagement force that the retainer member 8 may be disengaged from the engagement concave portion 9.

Also, in the present embodiments, contact surfaces which are inner surfaces 9a of the engagement concave portion 9 and with which the taper surfaces 8a of the retainer member 8 are brought into contact are also formed in the taper surfaces 9a, the engagement force of the retainer member 8 relative to the engagement concave portion 9 may be selected suitably also by the angle setup of the taper surfaces 9a of this engagement concave portion 9.

With such a structure, the present embodiment has the following operational effect.

When the second member 2 kept under the coupled and closed condition is opened to the first member 1, in the rotational range A1 from the coupled and closed position P1 to the predetermined open angle position P2 rotated in the open direction, the closing rotational biasing effect is generated to automatically close the second member 2 to the coupled and closed position P1 relative to the first member 1. Also, when the second member 2 is manually rotated in the open direction relative to the first member 1 exceeding the predetermined open angle position P2, the open rotational biasing effect is generated to automatically open the second member 2 up to the predetermined open angle position P3 relative to the first member 1. In the rotational range A2 from the position where the second member 2 is opened relative to the first member 1 to the predetermined open angle position P2 rotated in the closing direction, the free stop effect is generated to hold the second member 2 in any desired open angle position relative to the first member 1.

Namely, when the joint portion 2 is manually rotated in the open direction exceeding the predetermined open angle position P2 relative to the body portion 1, the joint portion 2 is automatically opened to the predetermined open angle position P3. When the joint portion 2 kept under the open condition to this predetermined open angle position P3 is rotated in the closing direction, in the rotational range A2 up to the predetermined open angle position P2, the joint portion 2 is always kept under the slant condition relative to the body portion 1. Exceeding the predetermined open angle position P2, the joint portion 1 is automatically closed to the coupled and closed position P1.

The operation of the hinge device H in this case will be described on the basis of the drawings.

Figure 13A:
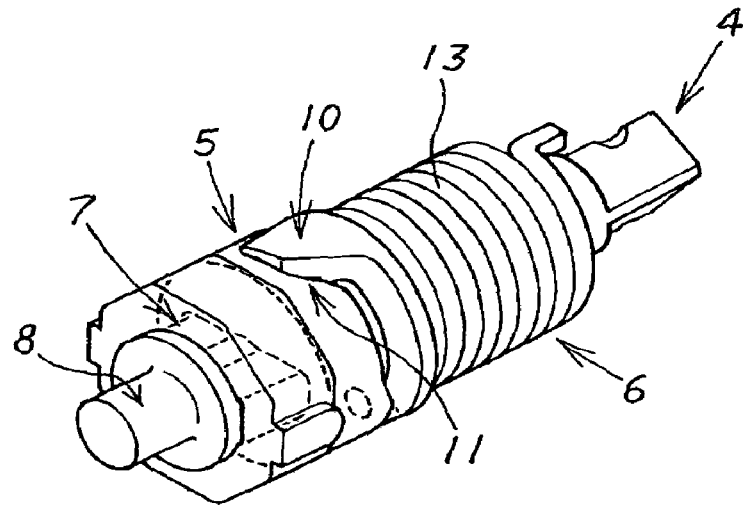
FIGS. 13(a) to 13(c) are schematic views of the operation of the primary part of the first embodiment.
Figure 13B:
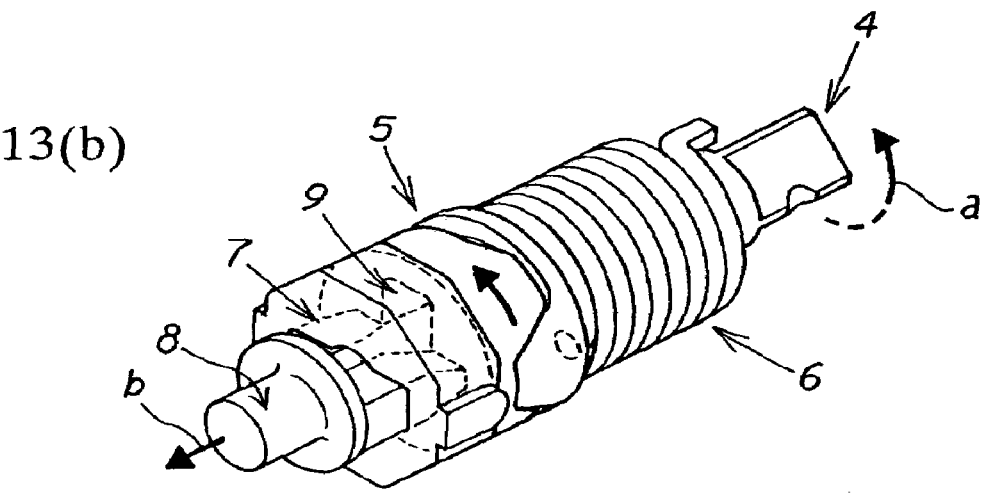
Figure 13C:
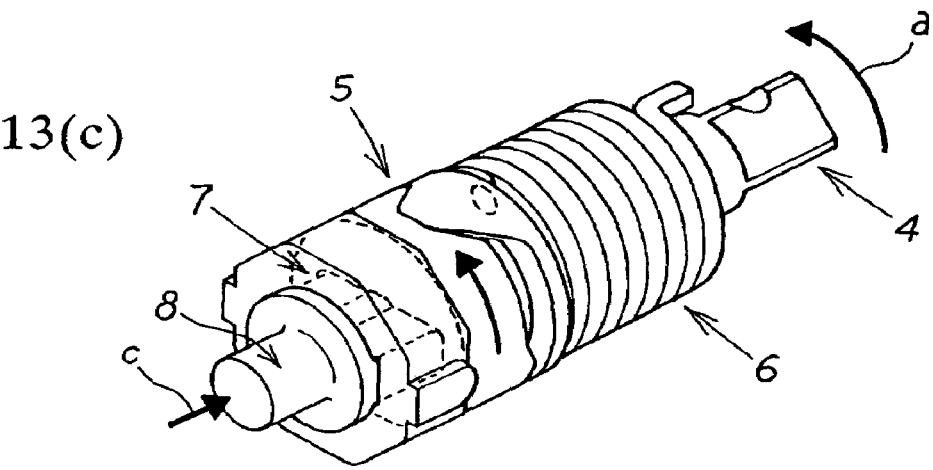

First of all, when the second joint member 4 is rotated in the direction of the arrow a in FIG. 13(b) by rotating the joint portion 2 in the open direction relative to the body portion 1, the cam portion 10 and the cam engagement portion 11 are cooperatively rotated in a somewhat disengaged manner while they are to be disengaged from each other. In this case, before the cam portion 10 and the cam engagement portion 11 are completely disengaged from each other, the retainer member 8 is completely disengaged from the engagement concave portion 9 of the cam engagement portion 11 while being retracted in the direction indicated by an arrow b (see FIG. 13(b)). After all, the cam portion 10 and the cam engagement portion 11 are biased by the rotational biasing member 13 and are cooperatively rotated under the engagement condition in the direction indicated by the arrow a in FIG. 13(c). Thereafter, the retainer member 8 biased by the engagement biasing member 22 is advanced again in the direction c in FIG. 13(c) and fitted and engaged with the engagement concave portion 9 (see FIG. 13(c)).

Until the cam portion 10 and the cam engagement portion 11 are completely disengaged from each other, the closing rotational biasing force for urging the joint portion 2 in the closing direction relative to the body portion 1 is generated. After the retainer member 8 has been completely disengaged from the engagement concave portion 9 of the cam engagement portion 11, the open rotational biasing force for urging the joint portion 2 in the open direction relative to the body portion 1 is generated.

Figure 14A:
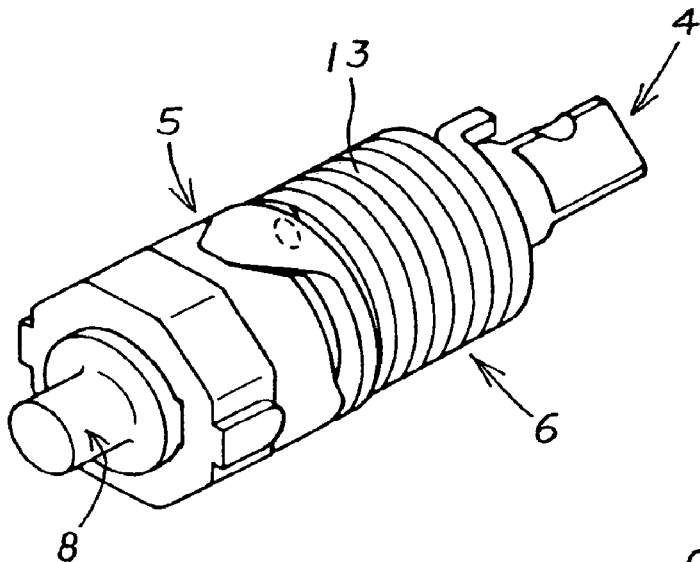
FIGS. 14(a) to 14(c) are schematic views of the operation of the primary part of the first embodiment.
Figure 14B:
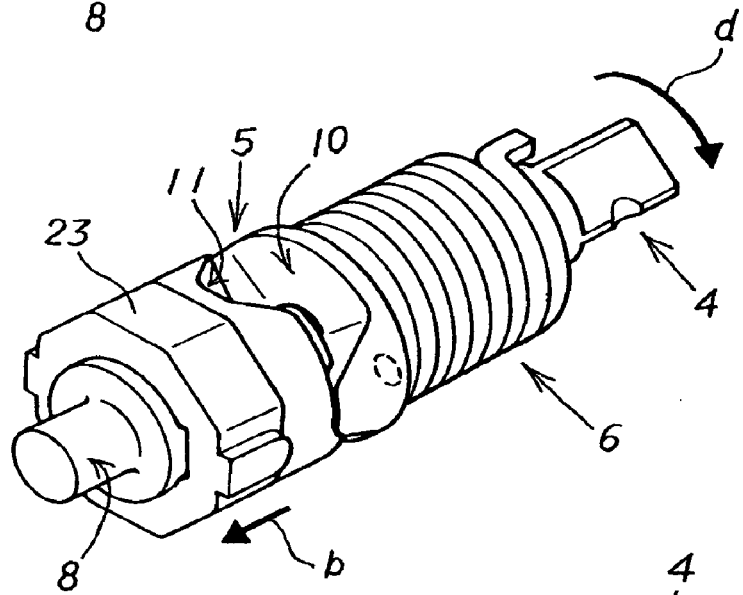
Figure 14C:
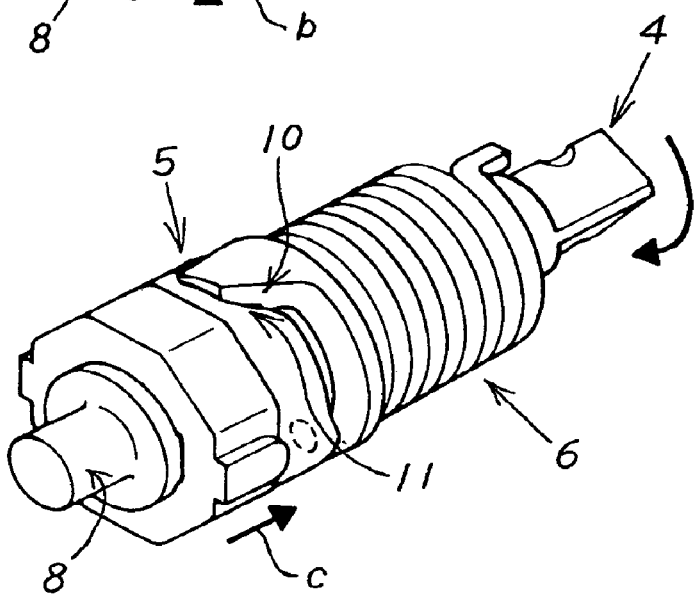
Figure 15:
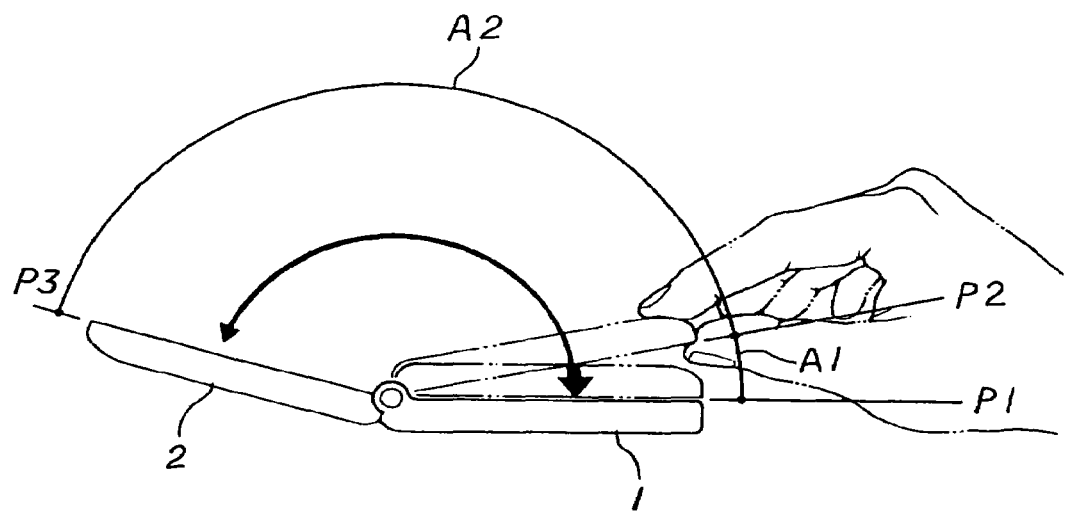
FIG. 15 is a schematic view of the operation of the first embodiment.

Subsequently, when the second joint member 4 is rotated in the direction indicated by an arrow d in FIG. 14(b) by rotating the joint portion 2 in the closing direction relative to the body portion 1, the cam engagement portion 11 is retained and held by the retainer member 8 and only the cam portion 10 is disengaged and rotated. (In the concave and convex engagement between the cam portion 10 and the cam engagement portion 11 in the direction in which the joint portion 2 is rotated in the closing direction relative to the body portion 1, i.e., in the direction in which only this cam portion 10 is rotated, the cam surface is set so that the engagement force of the retainer member 8 to the cam engagement portion 11 exceeds this engagement force whereby this cam engagement portion 11 is not cooperatively rotated but kept under the rotation stop condition. Accordingly, the cam portion 10 is rotated while being disengaged from the cam engagement portion 11.) In this case, the cam engagement portion 11 and the retainer member 8 are retracted in the direction indicated by b in FIG. 14(b) against the engagement biasing member 12 (and the engagement biasing member 22) so that the cam portion 10 and the cam engagement portion 11 are completely disengaged from each other (see FIG. 14(b)). Thereafter, until the second joint member 4 is further rotated in the direction indicated by the arrow d in FIG. 14 against the bias of the rotational biasing member 13 and the cam portion 10 and the cam engagement portion 11 are in dropping engagement with each other, the free stop effect is generated due to the frictional resistance between the apex portion 10a of the cam portion 10 and the apex portion 11a of the cam engagement portion 11. After passing through this free stop range, the cam portion 10 and the cam engagement portion 11 are biased by the engagement biasing member 12 and are in dropping engagement with each other to thereby generate the closing biasing rotational force whereby the joint portion 2 is completely brought into closed condition (FIG. 14(c)).

Therefore, according to the present embodiment, in use, for example, when the finger of the hand holding the phone is inserted between the joint portion 2 and the body portion 1 so that the joint portion 2 is rotated in the open direction relative to the body portion 1, the joint portion 2 is automatically opened due to the open rotational biasing operation. This is extremely useful because the opening operation of the joint portion 2 may readily and quickly be performed.

Also, in this embodiment, in the rotational range A2 from the position P3 where the joint portion 2 is opened at maximum by the open rotational biasing effect relative to the body portion 1 to the predetermined open angle position P2 where the joint portion is rotated in the closing direction, the free stop effect is generated for holding the second member 2 relative to the first member 1 at any desired angle portion. Accordingly, it is possible to use the phone while the joint portion 2 is stopped at a desired angle at which the phone is easy to use, which is more useful.

Embodiment 2

A specific embodiment 2 of the present invention will be described with reference to FIGS. 17 to 32.

Figure 17:
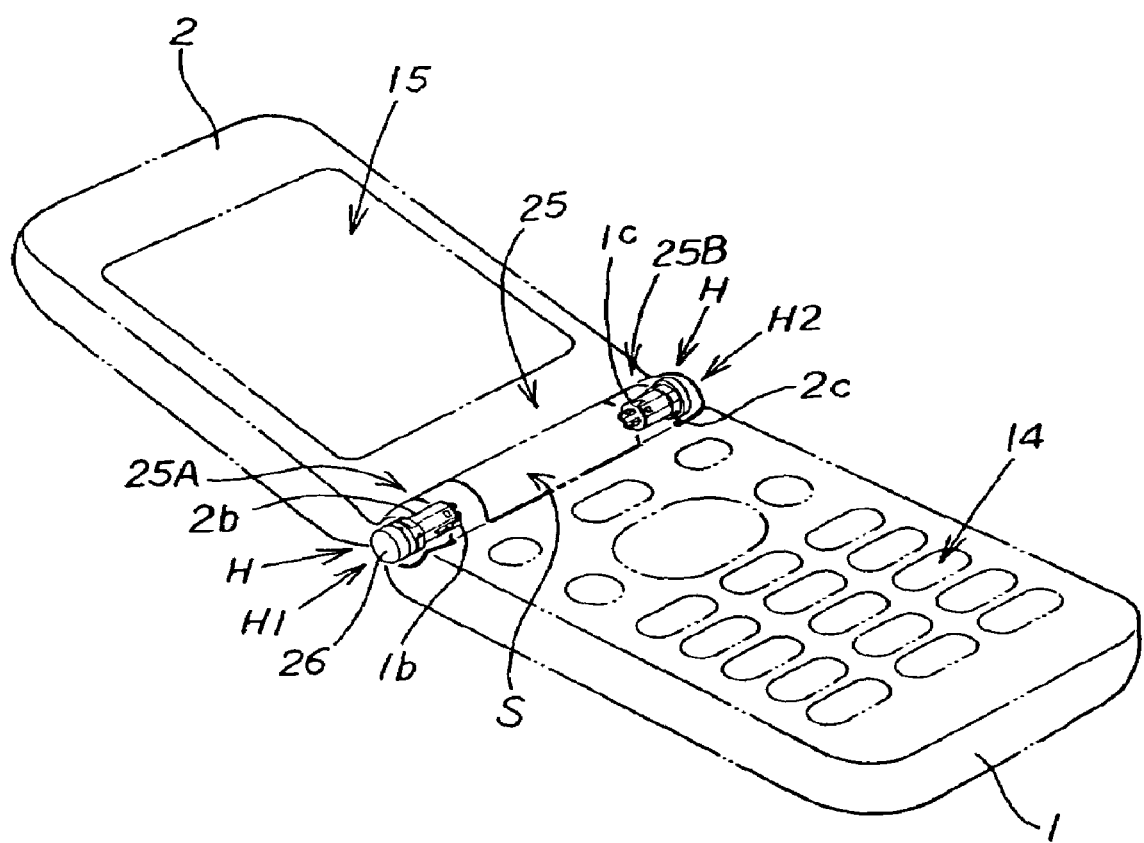
FIG. 17 is an illustrative view of use condition of a second embodiment.
Figure 18:
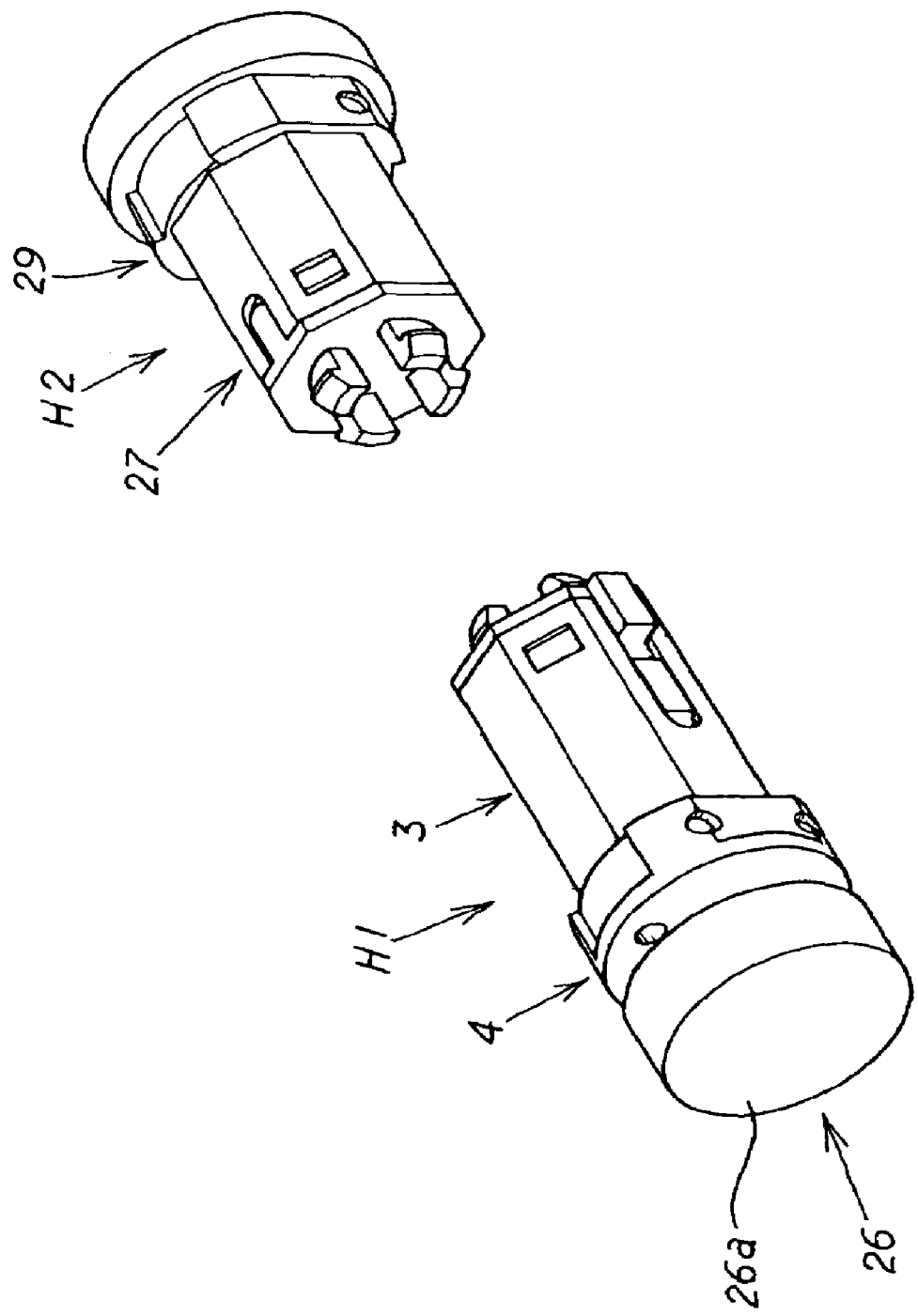
FIG. 18 is a perspective view showing the second embodiment.
Figure 19:
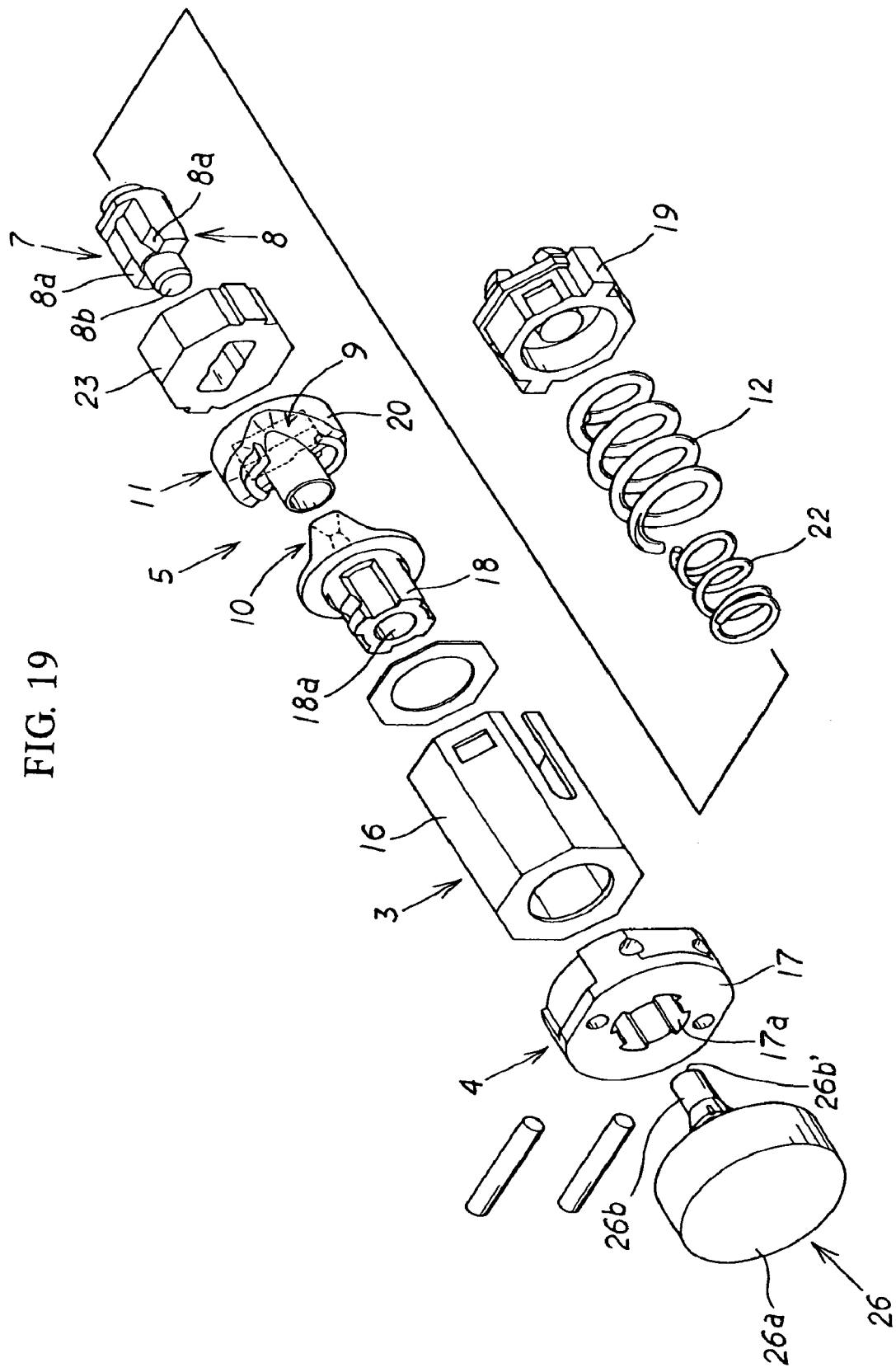
FIG. 19 is an exploded perspective view of a primary part of the second embodiment.
Figure 20:
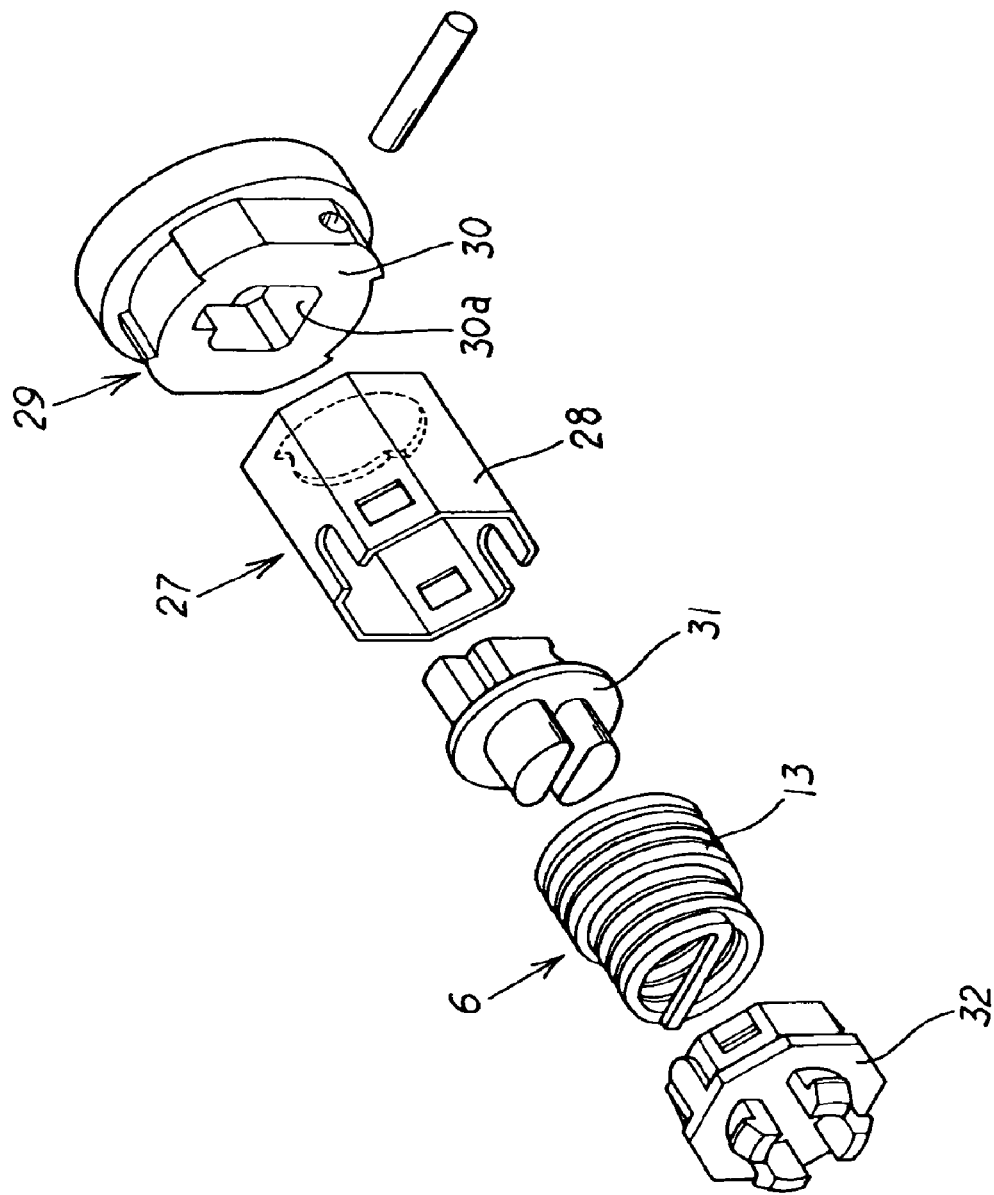
FIG. 20 is an exploded perspective view of the primary part of the second embodiment.
Figure 21:
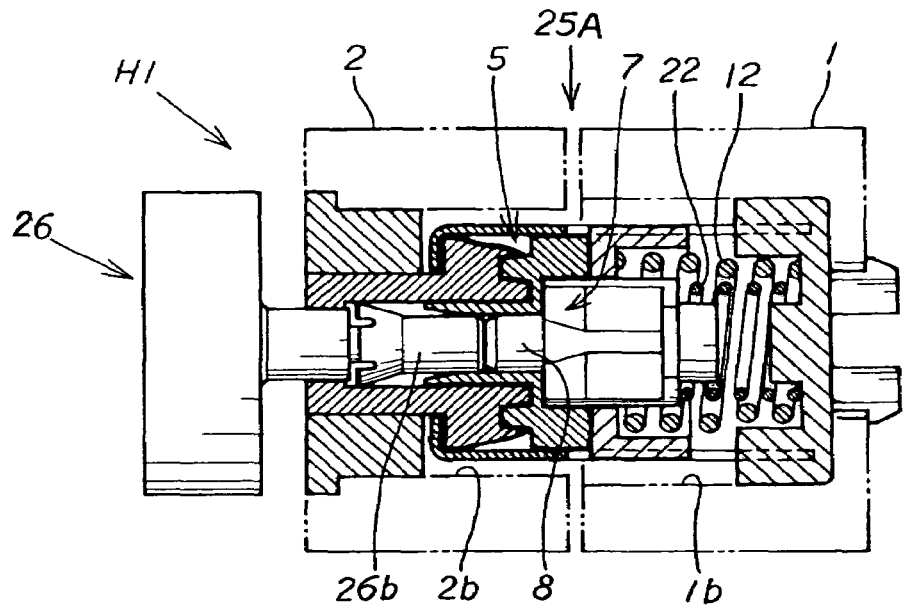
FIG. 21 is an illustrative cross-sectional view of the primary part of the second embodiment.
Figure 22:
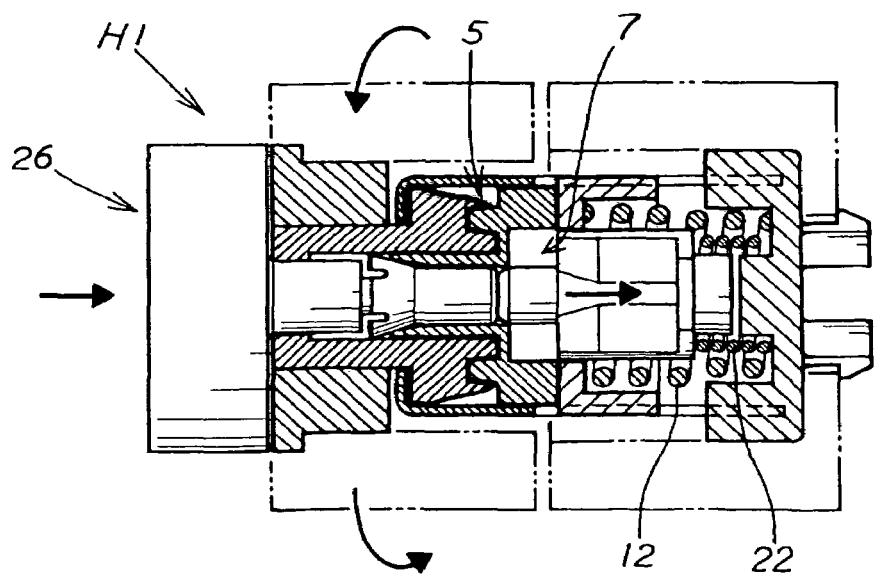
FIG. 22 is an illustrative cross-sectional view of the primary part of the second embodiment.
Figure 23:
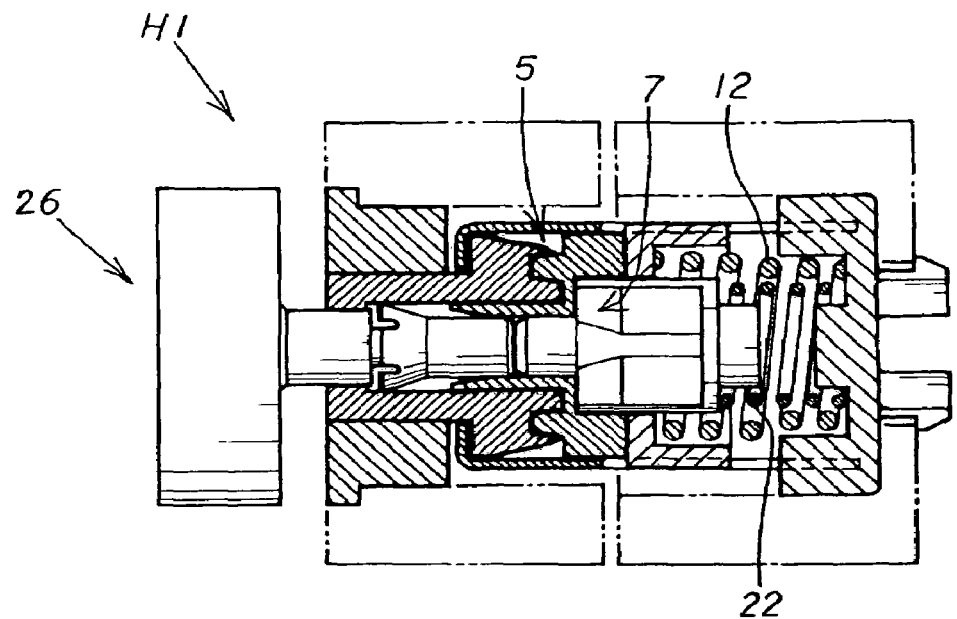
FIG. 23 is an illustrative cross-sectional view of the primary part of the second embodiment.
Figure 24:
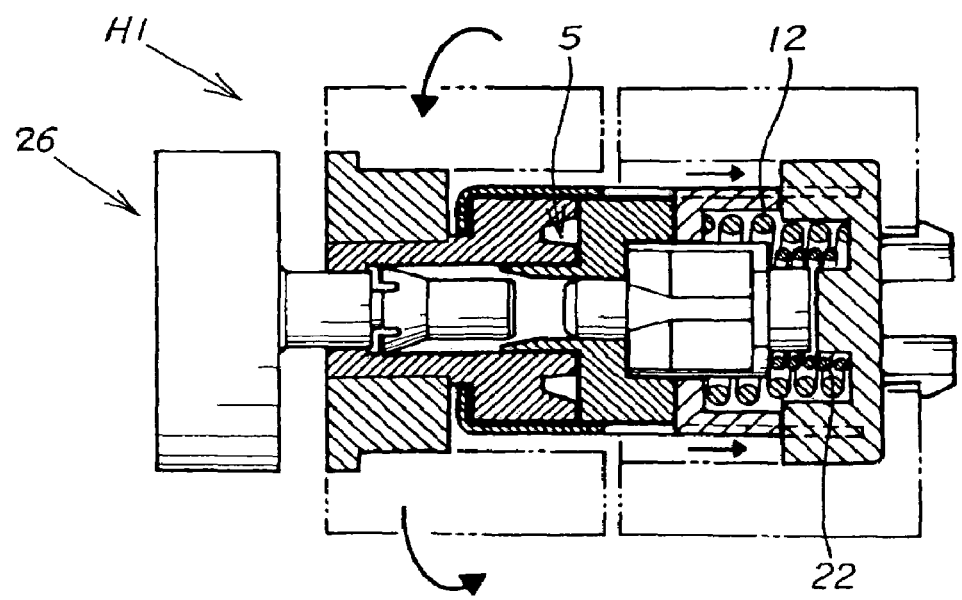
FIG. 24 is an illustrative cross-sectional view of the primary part of the second embodiment.
Figure 25:
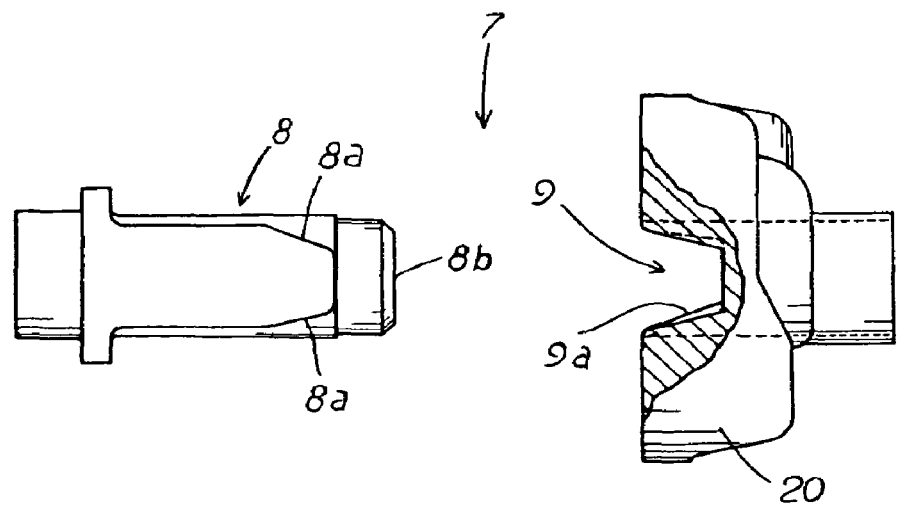
FIG. 25 is an illustrative view of the primary part of the second embodiment.
Figure 26:
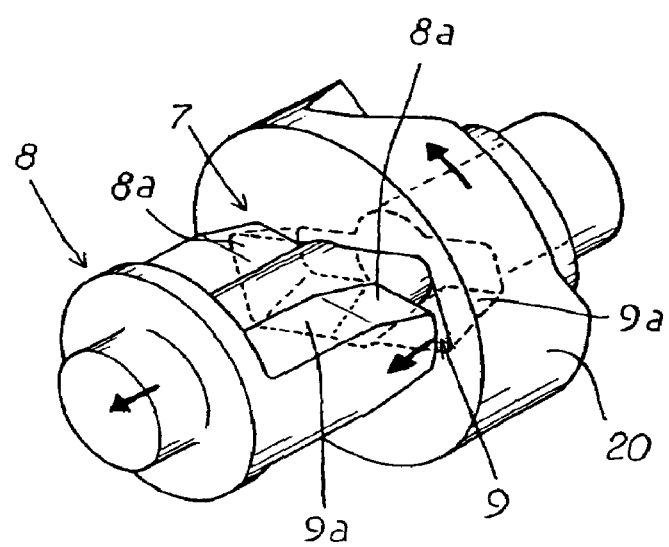
FIG. 26 is an illustrative view of the primary part of the second embodiment.
Figure 27:
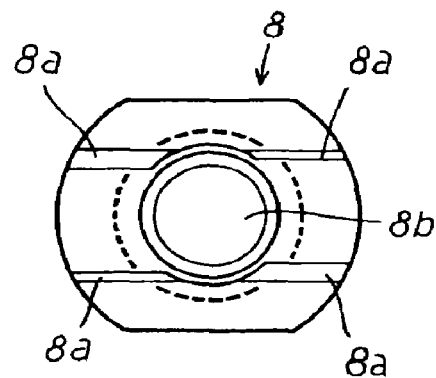
FIG. 27 is an end view of the primary part of the second embodiment.
Figure 28:
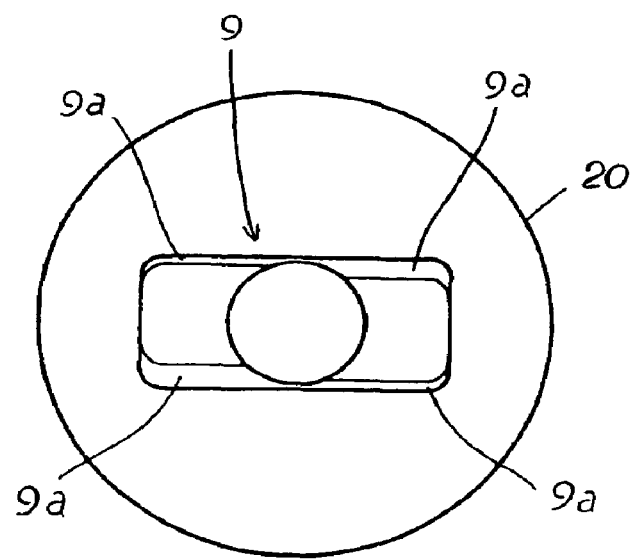
FIG. 28 is an end view of the primary part of the second embodiment.

In the same manner as the above-described embodiment 1, the embodiment 2 shows the case where a hinge device H according to the present invention is applied to a collapsible type portable phone as shown in FIG. 17. The hinge device H according to the present invention is applied to a pivot mechanism in which a body portion provided with an operating portion 14 is used as a first member 1 and a joint portion provided with a display image field 15 is used as a second member 2 to make it possible to take the condition from the closed condition where the first member 1 and the second member 2 are coupled with each other to the open condition (busy condition) where the second member 2 is rotated to, for example, 120 degrees.

Figure 32:
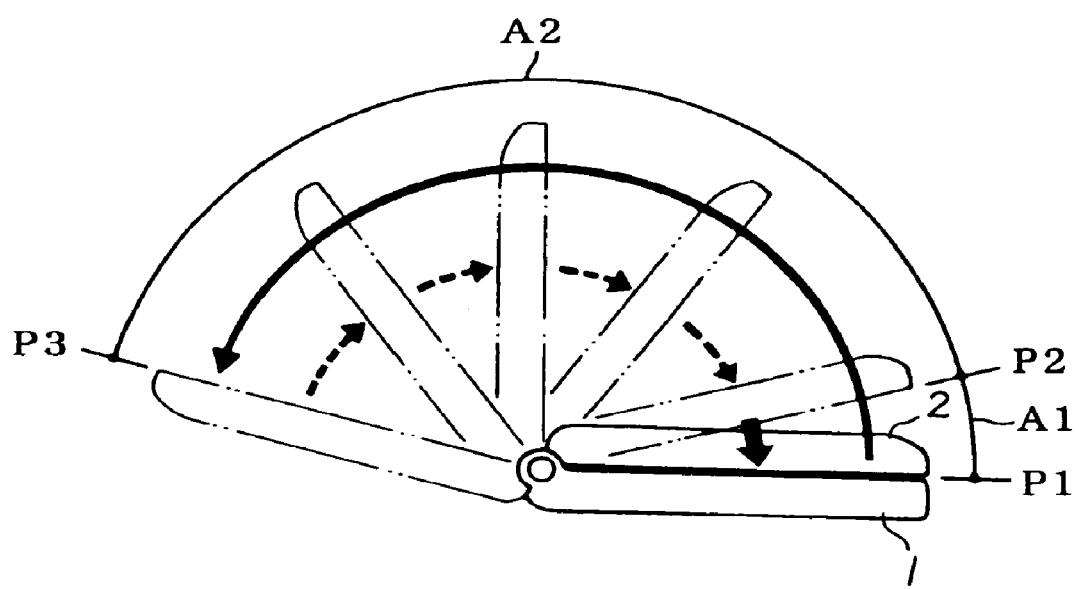
FIG. 32 is a schematic view of the operation of the second embodiment.

Then, when the second member 2 kept under the coupled and closed condition is opened to a first member 1, in a rotational range A1 from the coupled and closed position P1 to a predetermined open angle position P2 rotated in the open direction, a closing rotational biasing effect is generated to automatically close the second member 2 to the coupled and closed position P1 relative to the first member 1 (see FIG. 32), when the second member 2 is manually rotated in the open direction relative to the first member 1 exceeding the above-described predetermined open angle position P2, an open rotational biasing effect is generated to automatically open the second member 2 at once up to a predetermined open angle position P3 (maximum open angle position) relative to the first member 1 (see FIG. 32), and furthermore, in a rotational range A2 from the position where the second member 2 is opened to the first member 1 to the above-described predetermined open angle position P2 rotated in the closing direction, when the hand is released from the second member 2, the second member 2 stops in the released position to realize a free stop condition without any shake (see FIG. 32).

Also, the present embodiment is composed of a first hinge body H1 provided in a first pivot portion 25A provided at any one position of right and left positions of a pivot joint portion 25 between the first member 1 and the second member 2 and a second hinge member H2 provided in a second pivot portion 25B provided in the other position. A closing structure portion 5 is provided in the first hinge member H1 for generating a closing rotational biasing effect for automatically closing the second member 2 to the coupled and closed position P1 relative to the first member 1 when the second member 2 kept under the coupled and closed condition relative to the first member 1 is opened, in a rotational range A1 from the coupled and closed position P1 to a predetermined open angle position P2 rotated in the open direction. At the same time, an open structure portion 6 is provided in the second hinge member H2 for generating the open rotational biasing effect for automatically opening the second member 2 to the predetermined open angle position P3 relative to the first member 1 by urging this closing structure portion 5 in the rotational direction. A rotation preventing structure portion 7 is provided for releaseably engaging with the closing structure portion 5 and for preventing the rotation of the closing structure portion 5 by the opening structure portion 6. A depression button portion 26 for releasing the retention of the rotation preventing structure portion 7 to this closing structure portion 5 is provided in the rotation preventing structure portion 7.

More specifically, in the present embodiment, mounting holes 1b, 1c are provided in right and left portions of a proximal end of the first member 1, respectively. Also, mounting holes 2b, 2c adjacent to and in communication with the mounting holes 1b, 1c are provided in right and left portions of a proximal end of the second member 2, respectively. A hinge device H (first hinge member H1 and second hinge member H2) according to the present invention is applied as axial parts to the first pivot portion 25A and the second pivot portion 25B constituted by these respective mounting holes.

The first hinge member H1 will be described.

A casing 16 as a joint portion for constituting a part of a first joint member 3 having a rotational preventing shape through the above-described mounting hole 1b is fixed to the body portion 1 (first member). A member disposed at one end side of this casing 16 in the exposed condition as a mounting portion 17 constituting a second joint member 4 is fixed to the joint portion 2 (second member) through the mounting hole 2b in a rotation prevented manner. This casing 16 has an octagonal shape in cross section as shown. This is adapted to attain the firm rotation preventing structure to the body portion 1. At the same time, the octagonal shape is adapted as a shape which allows the parts to be received effectively in its interior while providing the rotation preventing structure.

An axial member 18 is provided at an inner hole 17a of the above-described mounting portion 17 under the rotation prevented condition to constitute the second joint member 4 provided with a cam portion 10.

The axial member 18 relating to this second joint member 4 is adapted so that the cam portion 10 is disposed rotatably within the casing 16 relating to the first joint member 3.

A closing member 19 is disposed on the other end side of the casing 16 relating to the first joint member 3, and furthermore, an engagement member 20 having a cam engagement portion 11 facing and engaging the cam portion 10 of the above-described second joint member 4 in a concave and convex manner is provided within the casing 16. This engagement member 20 is provided rotatably within the casing 16 and at the same time provided slidably in the disengagement direction within the casing 16.

A coiled spring 12 for biasing in the engaging direction is provided as an engagement biasing member 12 within the casing 16 between the engagement member 20 having this cam engagement portion 11 and the closing member 19. A tip end of this coiled spring 12 is coupled with a joint member 23 to be described later and the cam engagement portion 11 is biased in the engagement direction through this joint member 23.

When the joint portion 2 kept under the coupled and closed condition is opened to the body portion 1 by this engagement biasing member 12, in the rotational range A1 from the coupled and closed position P1 to the predetermined open angle position P2 rotated in the open direction, the cam portion 10 and the cam engagement portion 11 are slipped down and engaged with each other by biasing by the engagement biasing member 12 so that the closing rotational biasing effect for automatically closing the joint portion 2 up to the coupled and closed position P1 relative to the body portion 1 is generated. (This is referred to as the closing structure portion 5 in the claims.)

Also, when the joint portion 2 is manually rotated to the body portion 1 exceeding the predetermined open angle position P2 in the opening direction, the cam portion 10 and the cam engagement portion 11 are adapted to be rotated together under the engagement condition without disengagement therebetween.

Also, the cam engagement portion 11 is structured so that V-shaped concave portions are formed at diametrically 180 degree opposite positions, these concave portions are used as engagement portions with which the above-described cam portion 10 engages, and an apex portion (end face portion) of the cam portion 10 is brought into contact with an apex portion (end face portion) between the concave portions in the range of disengagement by the pressure force by the engagement biasing member 12.

In the present embodiment, a frictional resistance increasing means is provided for increasing a frictional resistance between the apex portion of the cam portion 10 and the apex portion of the cam engagement portion 11, and when the apex portion of the cam portion 10 and the apex portion of the cam engagement portion 11 are brought into abutment with each other, the engagement is held at a stop position by the increase of the rotational resistance due to the frictional resistance increasing means and the pressure force of the engagement biasing member 12 so far as the members are not moved by hands even if the rotational biasing force of the rotational biasing member 13 to be described later is applied.

Namely, the frictional resistance increasing means is structured so that the abutment area between the apex portion of the cam portion 10 and the apex portion of the cam engagement portion 11 is formed to be increased, whereby the frictional resistance between the apex portion of the cam portion 10 and the apex portion of the cam engagement portion 11 which are brought into pressing contact with each other by the biasing force of the engagement biasing member 12 is increased to realize the free stop. In the present embodiment, in the rotational range A2 from the position where the joint portion 2 is opened at maximum relative to the body portion 1 to the above-described predetermined open angle position P2 where the joint portion is rotated in the closed position, the free stop effect is generated for holding the joint portion 2 at any desired open angle position relative to the body portion 1.

More specifically, the sliding convex strips 11b each having a length in the rotational direction of the cam engagement portion 11 are provided in the convex portion of the cam engagement portion 11 and sliding concave grooves 10b with which the sliding convex strips 11b are brought into abutment and engagement are provided in the above-described cam portion 10 whereby the abutment area between the apex portion 10a of the cam portion 10 and the apex portion 11a of the cam engagement portion 11 is increased and the frictional resistance between the apex portion 10a of the cam portion 10 and the apex portion 11a of the cam engagement portion 11 is enhanced.

Also, in the present embodiment, the above-described sliding convex strips 11b each having a length in the rotational direction of this apex portion 11a are provided substantially in the whole range of the apex portion 11a of the engagement cam 11 whereby substantially in the whole range where the above-described cam portion 10 is disengaged from the cam engagement portion 11 and the apex portion 10a of the cam portion 10 and the apex portion 11a of the cam engagement portion 11 are brought into contact with each other, the sliding convex strips 11b are in abutment and engagement with the sliding concave grooves 10b under the abutment condition.

Figure 29:
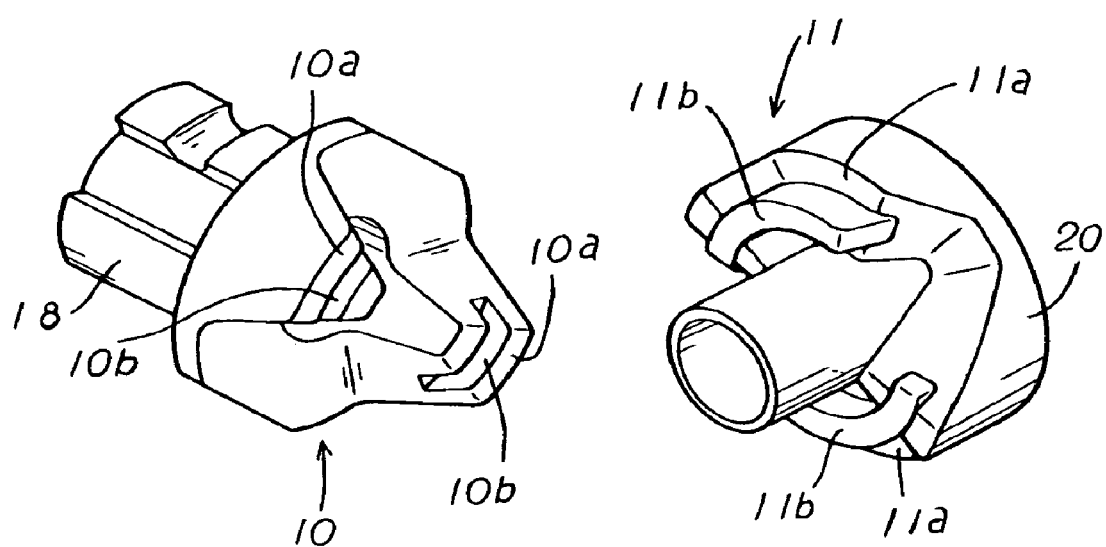
FIG. 29 is an exploded perspective view of the primary part of the second embodiment.

More specifically, as shown in FIG. 29, the sliding convex strips lib are formed into arcuate shapes having a center at the center of the cam engagement portion 11 substantially in the middle in the diametrical direction of the apex portion 11a of the cam engagement portion 11 and are formed into convex strips each having a length in the rotational direction of the apex portion 11a of the cam engagement portion 11.

Also, the sliding convex strips 11b and the sliding concave grooves 10b are formed into concave and convex shapes whose substantially whole surface portions are to be kept in abutment in the coupling engagement whereby the abutment areas of the apex portion 10a of the cam portion 10 and the apex portion 11a of the cam engagement portion 11 are increased to enhance the frictional resistance to make it possible to realize an extremely excellent free stop.

Namely, in the present embodiment, the extremely excellent free stop operation may be exhibited substantially in the whole rotational range where the cam engagement portion 11 is disengaged from the cam portion 10 and the apex portion 11a of the cam engagement portion 11 and the apex portion 10a of the cam portion 10 are brought into abutment with each other.

Also, in the present embodiment, a rotation preventing structure portion 7 is provided for releaseably engaging with the above-described closing structure portion 5 and for preventing the closing structure portion 5 from rotating in the open direction by the opening structure portion 6 provided in the second hinge member H2 to be described later.

More specifically, in this rotation preventing structure portion 7, the retainer member 8 for engaging and disengaging the engagement concave portion 9 provided in the cam engagement portion 11 is provided in the casing 16 constituting the first joint member 3. The retainer member 8 is provided slidably away from the engagement direction under the rotation prevented condition within the casing 16 through the joint member 23 and at the same time biased in the engagement direction by the engagement biasing member 22 as the coiled spring 22 for biasing in the engagement direction.

Also, the retainer member 8 is structured so that under the engagement condition with the cam engagement portion 11, the cooperative rotation between the cam portion 10 and the cam engagement portion 11 by the rotational biasing member 13 is prevented, at the same time, when this retainer member 8 is disengaged from the cam engagement portion 11, the cooperative rotation between the cam portion 10 and the cam engagement portion 11 is allowed by the rotational biasing member 13, and the engagement force of the retainer member 8 to this engagement portion 11 is set up to such an engagement force that the retainer member 8 is not disengaged from the cam engagement portion 11 by the biasing force of the rotational biasing member 13, and when the joint portion 2 is manually rotated in the opening direction relative to the body portion 1 exceeding the predetermined open angle position P2 against the closing rotational biasing force by the cam portion 10 and the cam engagement portion 11, the retainer member 8 may be disengaged from the cam engagement portion 11.

More specifically, in the retainer member 8, taper surfaces 8a are formed at a tip end insertion portion to be inserted into the engagement concave portion 9, and by the angle setup of these taper surfaces 8a, when the joint portion 2 is manually rotated in the opening direction relative to the body portion 1 exceeding the predetermined open angle position P2 against the closing rotational biasing force by the cam portion 10 and the cam engagement portion 11, the engagement force is set up to such an engagement force that the retainer member 8 is slidingly moved against the engagement bias of the engagement biasing member 22 so that the retainer member 8 may be disengaged from the engagement concave portion 9.

Also, in the present embodiments, contact surfaces which are inner surfaces 9a of the engagement concave portion 9 and with which the taper surfaces 8a of the retainer member 8 are brought into contact are also formed in the taper surfaces 9a, the engagement force of the retainer member 8 relative to the engagement concave portion 9 may be selected suitably also by the angle setup of the taper surfaces 9a of this engagement concave portion 9.

Also, this rotation preventing structure portion 7 is provided with the depression button portion 26 for releasing the retention of the retainer member 8 to the above-described closing structure portion 5.

More specifically, this depression button portion 26 is structured so that an axial portion 26b projects from an inner center position of a depression portion 26a having a circular shape in frontal view. This axial portion 26b is disposed to pass through an axial hole 18a provided in the axial member 18 relating to the second joint member 4 in a pull-apart preventing manner.

Also, the depression button portion 26 is provided with the axial portion 26b slidable within the axial hole 18a of the axial member 18. A tip end portion 26b' of the axial portion 26b is adapted to come into contact with a tip end face 8b of the above-described retainer member 8.

Accordingly, when the depression button portion 26 is operated to be depressed, the retainer member 8 is slidingly moved against the engagement bias of the engagement biasing member 22 so that the retention to the engagement concave portion 9 provided in the above-described cam engagement portion 11 is released.

The second hinge member H2 will be described.

A casing 28 as a joint portion constituting a part of a third joint member 27 having a rotation preventing shape through the above-described mounting hole 1c is fixed to the body portion 1 (first member). A member to be disposed in an exposed condition at one end side of this casing 28 is fixed in a rotation prevented manner to the joint portion 2 (second member) through the mounting hole 2c as a mounting portion 30 constituting a part of a fourth joint member 29. This casing 28 has an octagonal shape in cross section as shown. This is adapted to attain the firm rotation preventing structure to the body portion 1. At the same time, the octagonal shape is adapted as a shape which allows the parts to be received effectively in its interior while providing the rotation preventing structure.

Also, a joint member 31 to be coupled with a torque spring 13 as the rotational biasing member 13 is provided in a rotation prevented condition at a tip end portion to the inner hole 30a of the above-described mounting portion 30. The other end portion of this rotational biasing member 13 is coupled with a joint member 32 disposed in a rotation prevented condition at the other end portion of the casing 28. Accordingly, the biasing force of the rotational biasing member 13 for rotating the casing 28 functions as a biasing force for rotating the fourth joint member 29 with the casing 28 being fixed.

When the joint portion 2 is manually rotated to the body portion 1 exceeding the predetermined open angle position P2 in the opening direction by this rotational biasing member 13 relating to the second hinge member H2, or when the depression button portion 26 is operated to be depressed, the cam portion 10 and the cam engagement portion 11 as the closing structure portion 5 relating to the above-described first hinge member H1 are biased by the rotational biasing member 13 and rotated together under the engagement condition without disengagement there between so that the open rotational biasing effect is generated to automatically release the joint portion 2 up to the predetermined open angle position P3 relative to the body portion 1. (This is referred to as an opening structure portion 6 in the claims.)

With such a structure, the present embodiment has the following operational effect.

When the second member 2 kept under the coupled and closed condition is opened to the first member 1, in the rotational range A1 from the coupled and closed position P1 to the predetermined open angle position P2 rotated in the open direction, the closing rotational biasing effect is generated to automatically close the second member 2 to the coupled and closed position P1 relative to the first member 1. Also, when the second member 2 is manually rotated in the open direction relative to the first member 1 exceeding the predetermined open angle position P2, the open rotational biasing effect is generated to automatically open the second member 2 up to the predetermined open angle position P3 relative to the first member 1. In the rotational range A2 from the position where the second member 2 is opened relative to the first member 1 to the predetermined open angle position P2 rotated in the closing direction, the free stop effect is generated to hold the second member 2 in any desired open angle position relative to the first member 1.

Namely, when the joint portion 2 is manually rotated in the open direction exceeding the predetermined open angle position P2 relative to the body portion 1, or when the depression button portion 26 is operated to be depressed, the joint portion is automatically opened to the predetermined open angle position P3. When the joint portion 2 kept under the opened condition to this predetermined open angle position P3 is rotated in the closing direction, in the rotational range A2 up to the predetermined open angle position P2, the joint portion 2 is always kept under the slanted condition relative to the body portion 1. Exceeding the predetermined open angle position P2, the joint portion 1 is automatically closed to the coupled and closed position P1.

The operation of the hinge device H in this case will be described on the basis of the drawings.

Figure 30A:
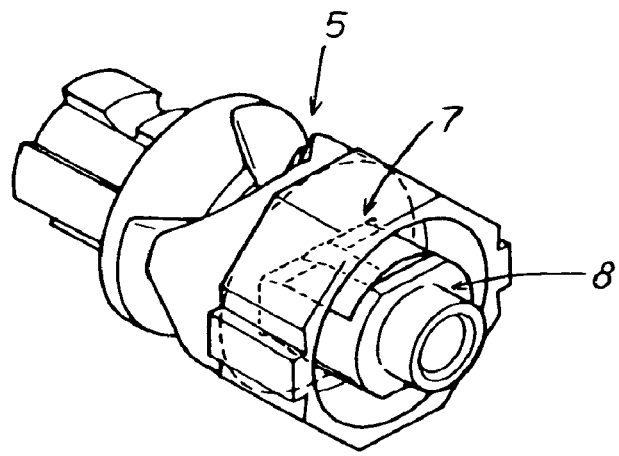
FIGS. 30(a) to 30(c) are schematic views of the operation of the primary part of the second embodiment.
Figure 30B:
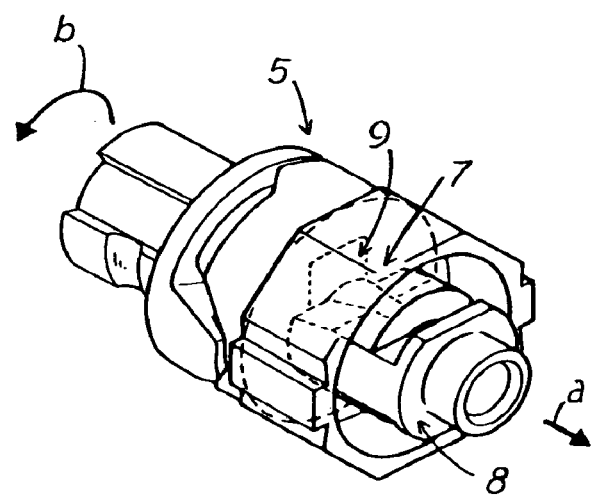
Figure 30C:
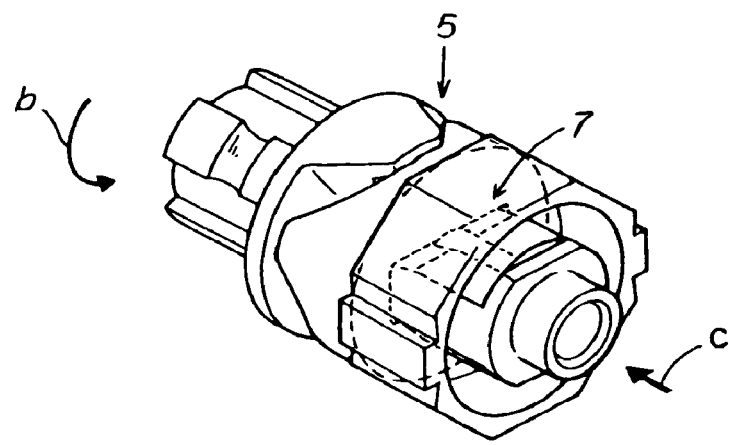

First of all, when the retainer member 8 is slidingly moved in the direction indicated by an arrow a in FIG. 30(b) by operating and depressing the depression button portion 26 relating to the first hinge member H1, the cam portion 10 and the cam engagement portion 11 are cooperatively rotated by the open rotational biasing force of the opening structure portion 6 (rotational biasing member 13) relating to the second hinge member H2 under the concave and convex engagement condition. In this case, since the retainer member 8 is always biased to be engaged by the engagement biasing member 22, after the cam portion 10 and the cam engagement portion 11 have been cooperatively rotated through about 180 degrees, the retainer member 8 is again engaged with the engagement concave portion 9 of the cam engagement portion 11 (see FIG. 30(c)).

Figure 31A:
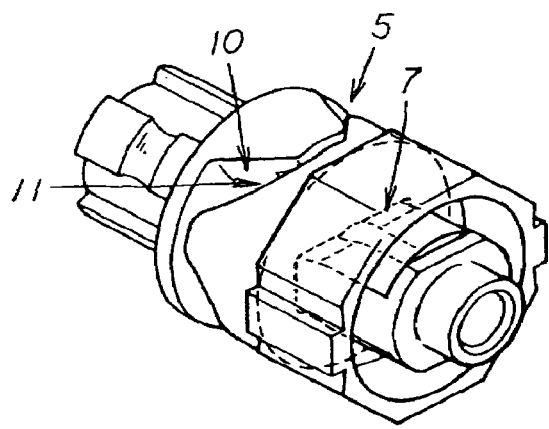
FIGS. 31(a) to 31(c) are schematic views of the operation of the primary part of the second embodiment.
Figure 31B:
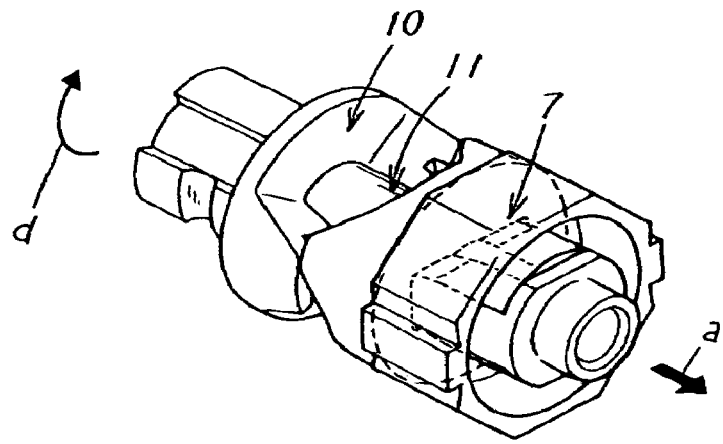
Figure 31C:
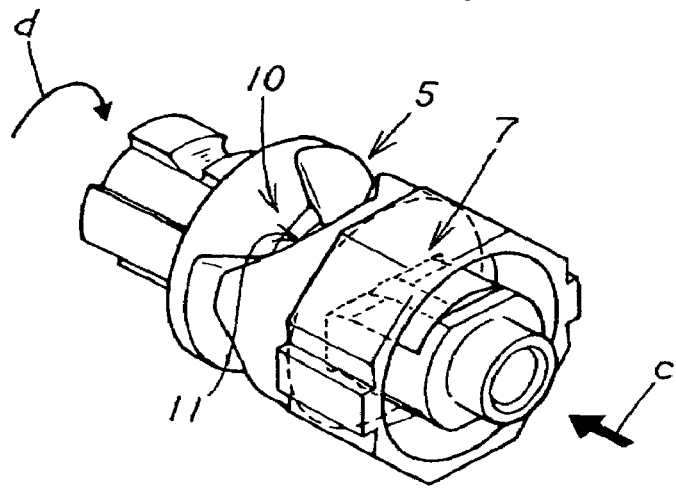

Subsequently, when the second joint member 4 is rotated in the direction indicated by an arrow d in FIG. 31(b) by rotating the joint portion 2 in the closing direction relative to the body portion 1, the cam engagement portion 11 is retained and held by the retainer member 8 and only the cam portion 10 is disengaged and rotated. In this case, the cam engagement portion 11 and the retainer member 8 are retracted in the direction a in FIG. 31(b) against the engagement biasing member 12 (and the engagement biasing member 22) and the cam portion 10 and the cam engagement portion 11 are completely disengaged from each other (see FIG. 31(b)). Thereafter, while the second joint member 4 is further rotated against the bias of the rotational biasing member 13 in the direction indicated by the arrow d in FIG. 31(c) and the cam portion 10 and the cam engagement portion 11 are in dropping engagement with each other, a free stop effect is generated due to the friction resistance between the apex portion 10a of the cam portion 10 and the apex portion 11a of the cam engagement portion 11. After this free stop range, the cam portion 10 and the cam engagement portion 11 are biased by the engagement biasing member 12 and in dropping engagement with each other to generate the closing biasing rotational force to thereby bring the joint portion 2 to the completely closed condition to the body portion 1 (see FIG. 31(c)).

Next, the operation of the hinge device H in the case where the joint portion 2 is manually opened to the body portion 1 will be described.

First of all, when the second joint member 4 is rotated by rotating the joint portion 2 in the open direction relative to the body portion 1, the cam portion 10 and the cam engagement portion 11 are cooperatively rotated in a somewhat disengaged manner while they are to be disengaged from each other. In this case, before the cam portion 10 and the cam engagement portion 11 are completely disengaged from each other, the retainer member 8 is completely disengaged from the engagement concave portion 9 of the cam engagement portion 11 while being retracted. Thereafter, the retainer member 8 biased by the engagement biasing member 22 is advanced again and fitted and engaged with the engagement concave portion 9.

Until the cam portion 10 and the cam engagement portion 11 are completely disengaged from each other, the closing rotational biasing force for urging the joint portion 2 in the closing direction relative to the body portion 1 is generated. After the retainer member 8 has been completely disengaged from the engagement concave portion 9 of the cam engagement portion 11, the open rotational biasing force for urging the joint portion 2 in the open direction relative to the body portion 1 is generated.

Subsequently, when the second joint member 4 is rotated by rotating the joint portion 2 in the closing direction relative to the body portion 1, the cam engagement portion 11 is retained and held by the retainer member 8 and only the cam portion 10 is disengaged and rotated. (In the concave and convex engagement between the cam portion 10 and the cam engagement portion 11 in the direction in which the joint portion 2 is rotated in the closing direction relative to the body portion 1, i.e., in the direction in which only this cam portion 10 is rotated, the cam surface is set so that the engagement force of the retainer member 8 to the cam engagement portion 11 exceeds this engagement force whereby this cam engagement portion 11 is not cooperatively rotated but kept under the rotation stop condition. Accordingly, the cam portion 10 is rotated while being disengaged from the cam engagement portion 11.) In this case, the cam engagement portion 11 and the retainer member 8 are retracted against the engagement biasing member 12 (and the engagement biasing member 22). Thereafter, until the second joint member 4 is further rotated against the bias of the rotational biasing member 13 and the cam portion 10 and the cam engagement portion 11 are in dropping engagement with each other, the free stop effect is generated due to the frictional resistance between the apex portion 10a of the cam portion 10 and the apex portion of the cam engagement portion 11. After passing through this free stop range, the cam portion 10 and the cam engagement portion 11 are biased by the engagement biasing member 12 and are in dropping engagement with each other to thereby generate the closing biasing power whereby the joint portion 2 is completely brought into closed condition.

Therefore, according to the present embodiment, in use, for example, when the finger of the hand holding the phone is inserted between the joint portion 2 and the body portion 1 so that the joint portion 2 is rotated in the open direction relative to the body portion 1, or the depression button portion 26 is operated to be depressed, the joint portion 2 is automatically opened due to the open rotational biasing operation. This is extremely useful because the opening operation of the joint portion 2 may readily and quickly be performed.

Also, in this embodiment, in the rotational range from the position P3 where the joint portion 2 is opened at maximum by the open rotational biasing effect relative to the body portion 1 to the predetermined open angle position P2 where the joint portion is rotated in the closing direction, the free stop effect is generated for holding the second member 2 relative to the first member 1 at any desired angle portion. Accordingly, it is possible to use the phone while the joint portion 2 is stopped at a desired angle at which the phone is easy to use, which is more useful.

Also, in the present embodiment, the hinge device H disposed to the pivotal joint portion 25 between the body portion 1 and the joint portion 2 is the hinge structure (double hinge structure) composed of the first hinge member H1 provided with the closing structure portion 5 and the rotation preventing structure portion 7 and the second hinge member H2 provided with the opening structure portion 6. Therefore, the pivotal joint portion 25 between the body portion 1 and the joint portion 2 for providing this hinge device H may be divided on the right and left sides and each pivotal portion (first pivotal portion 25A and second pivotal portion 25B) may be made small in size. Since a vacant space S may be formed between the right and left pivot portions (between the first pivot portion 25A and the second pivot portion 25B), this vacant space S serves to keep a sufficient space suitable for arranging wirings for electrically connecting electronic parts to be disposed within the joint portion 2 and electronic parts to be disposed within the body portion 1. Such effect and the like may be ensured.

The other is the same as those of the embodiment 1.

Incidentally, the present invention is not limited to or by the embodiments 1, 2 but the specific structure of each component may be designed as desired.

The invention claimed is:

1. A hinge device for pivoting a first member and a second member to be rotatably opened and closed, said hinge device comprising a first joint member coupled with the first member in a rotation prevented condition and a second joint member coupled relatively rotatably to the first joint member and coupled with the second member in a rotation prevented condition, wherein:

a cam portion is provided to either one of the first joint member and the second joint member;

a cam engagement portion, which engages with the cam portion, is provided to the other of the first joint member and the second joint member of said first member;

at least one of the cam portion and the cam engagement portion is provided translationally slidably in an engagement direction and a disengagement direction;

an engagement biasing member is provided for biasing at least one of the cam portion and the cam engagement portion in the engagement direction;

when the second member kept under the coupled and closed condition is opened to the first member, in a rotational range A1 to a predetermined open angle position P2 rotated in the open direction from the coupled and closed position P1, the cam portion and the cam engagement portion are biased by said engagement biasing member and the cam portion and the cam engagement portion are in a dropping engagement with each other whereby a closing rotation biasing effect is generated for automatically closing the second member to the coupled and closed position P1 relative to the first member;

a rotational biasing member is provided for biasing at least one of the cam portion and the cam engagement portion in a rotational direction;

when the second member is manually rotated in the open direction relative to the first member exceeding the predetermined open angle position P2, the cam portion and the cam engagement portion are biased by the rotational biasing member and the cam portion and the cam engagement portion are not disengaged from each other but rotated together under the engagement condition so that the open rotational biasing effect is generated for automatically opening the second member to the predetermined open angle position P3 relative to the first member;

a retainer member for releaseably retaining said cam portion or the cam engagement portion is provided in a rotation prevented manner in either one of said first joint member and said second joint member;

under the condition that the retainer member is retained at the cam portion or the cam engagement portion, the cooperative rotation of the cam portion and the cam engagement portion by said rotational biasing member is prevented;

when the retainer member is disengaged from the cam portion or the cam engagement portion, the cooperative rotation between the cam portion and the cam engagement portion by the rotational biasing member is allowed;

the retainer member is not disengaged from the cam portion or the cam engagement portion by the biasing force of said rotational biasing member; and when the second member is manually rotated in the opening direction exceeding the predetermined open angle position P2 against the closing rotational biasing force by the cam portion and the cam engagement portion relative to the first member, the retainer member is disengaged from the cam portion or the cam engagement portion.

2. A hinge device for pivoting a first member and a second member to be rotatably opened and closed, said hinge device comprising a first joint member coupled with the first member in a rotation prevented condition and a second joint member coupled relatively rotatably to the first joint member and coupled with the second member in a rotation prevented condition, wherein:

a cam portion is provided to either one of the first joint member and the second joint member;

a cam engagement portion, which engages with the cam portion, is provided to the other of the first joint member and the second joint member of said first member;

at least one of the cam portion and the cam engagement portion is provided translationally slidably in an engagement direction and a disengagement direction;

an engagement biasing member is provided for biasing at least one of the cam portion and the cam engagement portion in the engagement direction;

when the second member kept under the coupled and closed condition is opened to the first member, in a rotational range A1 to a predetermined open angle position P2 rotated in the open direction from the coupled and closed position P1, the cam portion and the cam engagement portion are biased by said engagement biasing member and in dropping engagement with each other whereby a closing rotation biasing effect is generated for automatically closing the second member to the coupled and closed position P1 relative to the first member;

a rotational biasing member is provided for biasing at least one of the cam portion and the cam engagement portion in a rotational direction;

when the second member is manually rotated in the open direction relative to the first member exceeding the predetermined open angle position P2, the cam portion and the cam engagement portion are biased by the rotational biasing member and are not disengaged from each other but rotated together under the engagement condition so that the open rotational biasing effect is generated for automatically opening the second member to the predetermined open angle position P3 relative to the first member;

when the second member is in a rotational range A2 of from the predetermined open angle position P3 to the predetermined open angle position P2 and the second member is rotated in the closing direction, the cam portion and the cam engagement portion are disengaged from each other;

an apex portion of the cam portion and an apex portion of the cam engagement portion are in abutment with each other by the bias of the engagement biasing member to generate a frictional resistance to thereby generate a free stop effect for holding the second member to the first member at any desired open angle position within the rotational range A2;

a retainer member for releaseably retaining said cam portion or the cam engagement portion is provided in a rotation prevented manner in either one of said first joint member and said second joint member;

under the condition that the retainer member is retained at the cam portion or the cam engagement portion, the cooperative rotation of the cam portion and the cam engagement portion by said rotational biasing member is prevented;

when the retainer member is disengaged from the cam portion or the cam engagement portion, the cooperative rotation between the cam portion and the cam engagement portion by the rotational biasing member is allowed;

the retainer member is not disengaged from the cam portion or the cam engagement portion by the biasing force of said rotational biasing member; and when the second member is manually rotated in the opening direction exceeding the predetermined open angle position P2 against the closing rotational biasing force by the cam portion and the cam engagement portion relative to the first member, the retainer member is disengaged from the cam portion or the cam engagement portion.

3. The hinge device according to claim 1, further characterized in that an engagement concave portion for fitting and retaining said retainer member is provided in said cam portion or said cam engagement portion, and a taper surface is formed in an insertion portion of the retainer member to be inserted into said engagement concave portion whereby the retainer member is disengaged from the cam portion or the cam engagement portion when the second member is manually rotated relative to the first member in the open direction exceeding the predetermined open angle position P2 against the closing rotation biasing force by the cam portion and the cam engagement portion.

4. The hinge device according to claim 1, further characterized in that said retainer member is translationally slidingly moved by a depression operation of a depression button portion so that the retention to a closing structure portion is released.

5. An electronic equipment using the hinge device according to claim 1, wherein the first member or the second member is a body portion provided with an operating portion and the other one of the first member or the second member is a joint portion provided with a display image field, and the joint portion is disposed to cover the operating portion when said operating portion is not operative, and the hinge device is for coupling said body portion and said joint portion rotatably so that said joint portion is rotated horizontally or in a rising manner from the coupled condition to expose the operating portion or the joint portion may be rotated around its own axis to be turned inside out.

6. The hinge device according to claim 2, wherein an engagement concave portion for fitting and retaining said retainer member is provided in said cam portion or said cam engagement portion, and a taper surface is formed in an insertion portion of the retainer member to be inserted into said engagement concave portion whereby the retainer member is disengaged from the cam portion or the cam engagement portion when the second member is manually rotated relative to the first member in the open direction exceeding the predetermined open angle position P2 against the closing rotation biasing force by the cam portion and the cam engagement portion.

7. The hinge device according to claim 2, wherein said retainer member is translationally slidingly moved by a depression operation of a depression button portion so that the retention to a closing structure portion is released.

8. An electronic equipment using the hinge device according to claim 2, wherein the first member or the second member is a body portion provided with an operating portion and the other one of the first member or the second member is a joint portion provided with a display image field, and the joint portion is disposed to cover the operating portion when said operating portion is not operative, and the hinge device is for coupling said body portion and said joint portion rotatably so that said joint portion is rotated horizontally or in a rising manner from the coupled condition to expose the operating portion or the joint portion may be rotated around its own axis to be turned inside out.

9. An electronic equipment using the hinge device according to claim 3, wherein the first member or the second member is a body portion provided with an operating portion and the other one of the first member or the second member is a joint portion provided with a display image field, and the joint portion is disposed to cover the operating portion when said operating portion is not operative, and the hinge device is for coupling said body portion and said joint portion rotatably so that said joint portion is rotated horizontally or in a rising manner from the coupled condition to expose the operating portion or the joint portion may be rotated around its own axis to be turned inside out.

10. An electronic equipment using the hinge device according to claim 4, wherein the first member or the second member is a body portion provided with an operating portion and the other one of the first member or the second member is a joint portion provided with a display image field, and the joint portion is disposed to cover the operating portion when said operating portion is not operative, and the hinge device is for coupling said body portion and said joint portion rotatably so that said joint portion is rotated horizontally or in a rising manner from the coupled condition to expose the operating portion or the joint portion may be rotated around its own axis to be turned inside out.

\* \* \* \* \*